US012055980B2

(12) United States Patent
Jun

(10) Patent No.: US 12,055,980 B2
(45) Date of Patent: Aug. 6, 2024

(54) ELECTRONIC DEVICE INCLUDING MULTIPLE KEYS AND METHOD FOR OPERATING THE SAME

(71) Applicant: Samsung Electronics Co., Ltd., Suwon-si (KR)

(72) Inventor: Chulmin Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 17/667,078

(22) Filed: Feb. 8, 2022

(65) Prior Publication Data

US 2022/0253109 A1 Aug. 11, 2022

Related U.S. Application Data

(63) Continuation of application No. PCT/KR2022/001717, filed on Feb. 3, 2022.

(30) Foreign Application Priority Data

Feb. 8, 2021 (KR) .................. 10-2021-0017904

(51) Int. Cl.
*G06F 1/16* (2006.01)
*H04N 23/57* (2023.01)
(Continued)

(52) U.S. Cl.
CPC .......... *G06F 1/1677* (2013.01); *G06F 1/1618* (2013.01); *G06F 1/1671* (2013.01);
(Continued)

(58) Field of Classification Search
CPC .... G06F 1/1677; G06F 1/1671; G06F 1/1618; G06F 1/1686; H04N 23/69; H04N 23/57
See application file for complete search history.

(56) References Cited

U.S. PATENT DOCUMENTS 9,823,631 B1 11/2017 Loo et al.
2004/0049743 A1 3/2004 Bogward
(Continued)

FOREIGN PATENT DOCUMENTS

CN 105353829 A 2/2016
CN 110007716 A 7/2019
(Continued)

OTHER PUBLICATIONS

International Search Report dated May 3, 2022, issued in International Application No. PCT/KR2022/001717.

*Primary Examiner* — Phong H Dang
(74) *Attorney, Agent, or Firm* — Jefferson IP Law, LLP

(57) ABSTRACT

According to various embodiments, there may be provided an electronic device, comprising a first housing including a first surface and a second surface facing in a direction opposite to a direction in which the first surface faces, a second housing including a third surface corresponding to the first surface of the first housing and a fourth surface facing in a direction opposite to a direction in which the third surface faces, a hinge rotatably connecting the first housing and the second housing, at least one first camera disposed on the first surface of the first housing and at least one second camera disposed on the second surface, a display disposed on the first surface of the first housing, a plurality of keys disposed on the third surface of the second housing, a sensor, and at least one processor, wherein the at least one processor is configured to execute a camera application, identify a change in a folding angle between the first housing and the second housing while the camera application is executed, using the sensor, identify at least one first input using at least one of first keys among the plurality of keys and identify at least one second input using at least one of remaining second keys, different from the first keys, among the plurality of keys, and perform a function of the camera application (Continued)

corresponding to the at least one first input and the at least one second input, based on the changed folding angle being included in a designated angle range.

22 Claims, 18 Drawing Sheets

(51) Int. Cl.
*H04N 23/69* (2023.01)
*H04N 23/62* (2023.01)

(52) U.S. Cl.
CPC ........... *G06F 1/1686* (2013.01); *H04N 23/57* (2023.01); *H04N 23/69* (2023.01); *H04N 23/62* (2023.01)

(56) References Cited

U.S. PATENT DOCUMENTS

| | | | |
|---|---|---|---|
| 2004/0108990 | A1 | 6/2004 | Lieberman et al. |
| 2004/0263476 | A1 | 12/2004 | Lim et al. |
| 2004/0263484 | A1* | 12/2004 | Mantysalo .......... H04M 1/0214 345/173 |
| 2006/0247046 | A1 | 11/2006 | Choi et al. |
| 2010/0271470 | A1 | 10/2010 | Stephan et al. |
| 2011/0084893 | A1* | 4/2011 | Lee .................... G06F 3/016 345/6 |
| 2011/0141218 | A1 | 6/2011 | Stancato |
| 2012/0147535 | A1 | 6/2012 | Ahn et al. |
| 2012/0323362 | A1 | 12/2012 | Paydar et al. |
| 2014/0062890 | A1 | 3/2014 | Leung et al. |
| 2016/0301832 | A1* | 10/2016 | Xu ...................... H04N 23/60 |
| 2017/0235355 | A1 | 8/2017 | Alshinnawi et al. |
| 2017/0357292 | A1* | 12/2017 | Cho .................... H04M 1/0216 |
| 2020/0076933 | A1* | 3/2020 | Xiao .................... G06F 1/3265 |
| 2020/0125179 | A1 | 4/2020 | Okuley |
| 2021/0105389 | A1* | 4/2021 | Ko ..................... G06F 3/04845 |
| 2022/0060572 | A1* | 2/2022 | Kwon ................. H04M 1/72454 |
| 2022/0116533 | A1* | 4/2022 | Yan .................... H04M 1/0216 |
| 2022/0206535 | A1* | 6/2022 | Hyun .................. G06F 3/04883 |
| 2022/0299316 | A1* | 9/2022 | Peng .................... H04N 23/698 |

FOREIGN PATENT DOCUMENTS

| | | |
|---|---|---|
| JP | 2006-227409 A | 8/2006 |
| JP | 2016-035691 A | 3/2016 |
| KR | 10-1999-0004351 A | 1/1999 |
| KR | 10-2001-0025756 A | 4/2001 |
| KR | 10-2001-0068232 A | 7/2001 |
| KR | 10-2003-0072591 A | 9/2003 |
| KR | 10-2004-0034259 A | 4/2004 |
| KR | 10-2005-0000276 A | 1/2005 |
| KR | 10-2005-0012596 A | 2/2005 |
| KR | 10-2005-0081221 A | 8/2005 |
| KR | 10-2006-0029237 A | 4/2006 |
| KR | 10-2006-0063868 A | 6/2006 |
| KR | 10-2006-0082849 A | 7/2006 |
| KR | 10-2007-0015434 A | 2/2007 |
| KR | 10-0770443 B1 | 10/2007 |
| KR | 10-0820298 B1 | 4/2008 |
| KR | 10-0860112 B1 | 9/2008 |
| KR | 10-2009-0044105 A | 5/2009 |
| KR | 10-2010-0084601 A | 7/2010 |
| KR | 10-2010-0117038 A | 11/2010 |
| KR | 10-2011-0038980 A | 4/2011 |
| KR | 10-2011-0055030 A | 5/2011 |
| KR | 10-2012-0064585 A | 6/2012 |
| KR | 10-2012-0083030 A | 7/2012 |
| KR | 10-2012-0110929 A | 10/2012 |
| KR | 10-1307583 B1 | 9/2013 |
| KR | 10-2014-0033073 A | 3/2014 |
| KR | 10-2014-0094173 A | 7/2014 |
| KR | 10-2015-0140286 A | 12/2015 |
| KR | 10-1639275 B1 | 7/2016 |
| KR | 10-2017-0086242 A | 7/2017 |
| KR | 10-2020-0142909 A | 12/2020 |

* cited by examiner

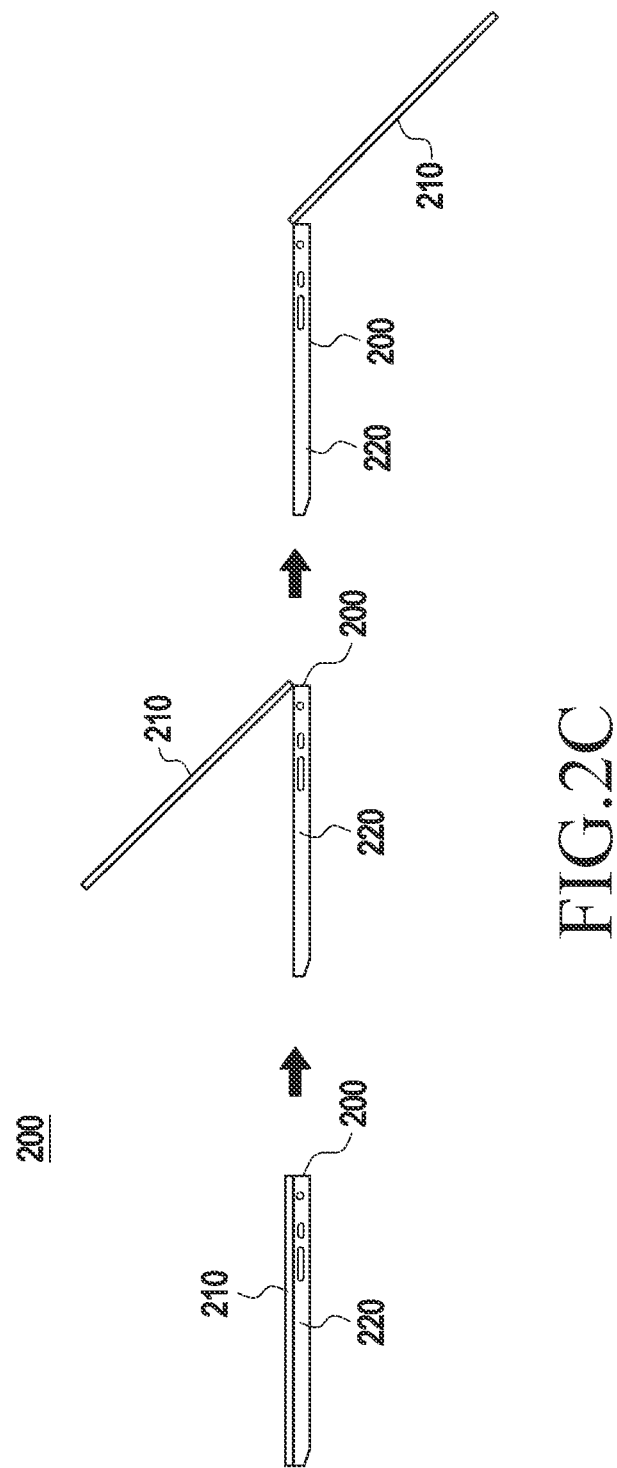

ELECTRONIC DEVICE INCLUDING MULTIPLE KEYS AND METHOD FOR OPERATING THE SAME

CROSS-REFERENCE TO RELATED APPLICATION(S)

This application is a continuation application, claiming priority under § 365(c), of an International application No. PCT/KR2022/001717, filed on Feb. 3, 2022, which is based on and claims the benefit of a Korean patent application number 10-2021-0017904, filed on Feb. 8, 2021, in the Korean Intellectual Property Office, the disclosure of which is incorporated by reference herein in its entirety.

BACKGROUND

The disclosure relates to an electronic device, e.g., an electronic device including a plurality of keys, and a method for operating the same.

Laptop computers have the advantage of being portable and provide almost the same functions that desktop computers can. However, despite higher costs than desktop computers. there is increasing demand for laptop computers for private or business use. Further, laptop computers are replacing desktop computers.

A laptop computer includes a touchscreen and a keyboard with a plurality of keys as input devices. The user may control the laptop computer by transferring input through the touchscreen or the plurality of keys.

However, since the user uses the laptop computer while holding the laptop computer, it is necessary to implement a technique using the input devices for efficient control of the laptop computer.

The above information is presented as background information only to assist with an understanding of the disclosure. No determination has been made, and no assertion is made, as to whether any of the above might be applicable as prior art with regard to the disclosure.

An electronic device (e.g., a laptop computer) may include two housings rotatably connected and a touchscreen and a keyboard provided, as input devices, on each of the housings. The folding angle formed between the two housings of the electronic device may be changed to various angles and may be included in a designated angle range (e.g., 180 degrees or more). In a state in which the folding angle is included in the designated angle range, the user may grip and use the electronic device. The user need transfer input to the electronic device using the touchscreen or keyboard of the electronic device. However, the user's convenience may be reduced in using the touchscreen or the keyboard with the electronic device in his hand. For example, it may be difficult for the user to touch an icon included in the execution screen of an application displayed on the touchscreen while holding the electronic device. Further, if improperly holding the electronic device, the user may drop the electronic device, causing damage to the electronic device.

Aspects of the disclosure are to address at least the above-mentioned problems and/or disadvantages and to provide at least the advantages described below.

According to various embodiments, an electronic device and a method for operating the same may control a running application (e.g., a camera application) based on at least one input identified using at least some of a plurality of keys when the folding angle between the housings is within a designated angle range, thereby enhancing the user's convenience in using the electronic device.

Additional aspects will be set forth in part in the description which follows and, in part, will be apparent from the description, or may be learned by practice of the presented embodiments.

SUMMARY

According to various embodiments, there may be provided an electronic device, comprising a first housing including a first surface and a second surface facing in a direction opposite to a direction in which the first surface faces; a second housing including a third surface corresponding to the first surface of the first housing and a fourth surface facing in a direction opposite to a direction in which the third surface faces; a hinge rotatably connecting the first housing and the second housing; at least one first camera disposed on the first surface of the first housing and at least one second camera disposed on the second surface; a display disposed on the first surface of the first housing; a plurality of keys disposed on the third surface of the second housing; a sensor; and at least one processor; wherein the at least one processor is configured to: execute a camera application, identify a change in a folding angle between the first housing and the second housing while the camera application is executed, using the sensor, identify at least one first input using at least some of first keys among the plurality of keys and identify at least one second input using at least some of remaining second keys, different from the first keys, among the plurality of keys, and perform a function of the camera application corresponding to the at least one first input and the at least one second input, based on the changed folding angle being included in a designated angle range.

According to various embodiments, there may be provided a method for operating an electronic device, comprising executing a camera application; identifying a change in a folding angle between a first housing and a second housing of the electronic device while the camera application is executed, using a sensor of the electronic device; identifying at least one first input using at least some of first keys among the plurality of keys and identifying at least one second input using at least some of remaining second keys, different from the first keys, among the plurality of keys; and performing a function of the camera application corresponding to the at least one first input and the at least one second input, based on the changed folding angle being included in a designated angle range.

According to various embodiments, there may be provided an electronic device, comprising a first housing including a first surface and a second surface facing in a direction opposite to a direction in which the first surface faces; a second housing including a third surface corresponding to the first surface of the first housing and a fourth surface facing in a direction opposite to a direction in which the third surface faces; a hinge rotatably connecting the first housing and the second housing; at least one first camera disposed on the first surface of the first housing and at least one second camera disposed on the second surface; a display disposed on the first surface of the first housing; a plurality of keys disposed on the third surface of the second housing; a sensor; and at least one processor; wherein the at least one processor is configured to: execute a camera application, receive an input through at least some of the plurality of keys while the camera application is executed, perform a first function of the camera application corresponding to the input, based on a folding angle between the first housing and the second housing identified through the sensor being included in a designated angle range, and perform a second function of the camera application corresponding to text corresponding to the input, based on the folding angle being not included in the designated angle range.

Embodiments of the disclosure are not limited to the foregoing objectives, and other objectives would readily be appreciated by a skilled artisan from the following detailed description taken in conjunction with the accompanying drawings. According to various embodiments, an electronic device and a method for operating the same which may control a running application (e.g., a camera application) based on at least one input identified using at least some of a plurality of keys when the folding angle between the housings is within a designated angle range, thereby enhancing the user's convenience in using the electronic device are provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2C is a view illustrating rotation of a plurality of housings of an electronic device according to various embodiments;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
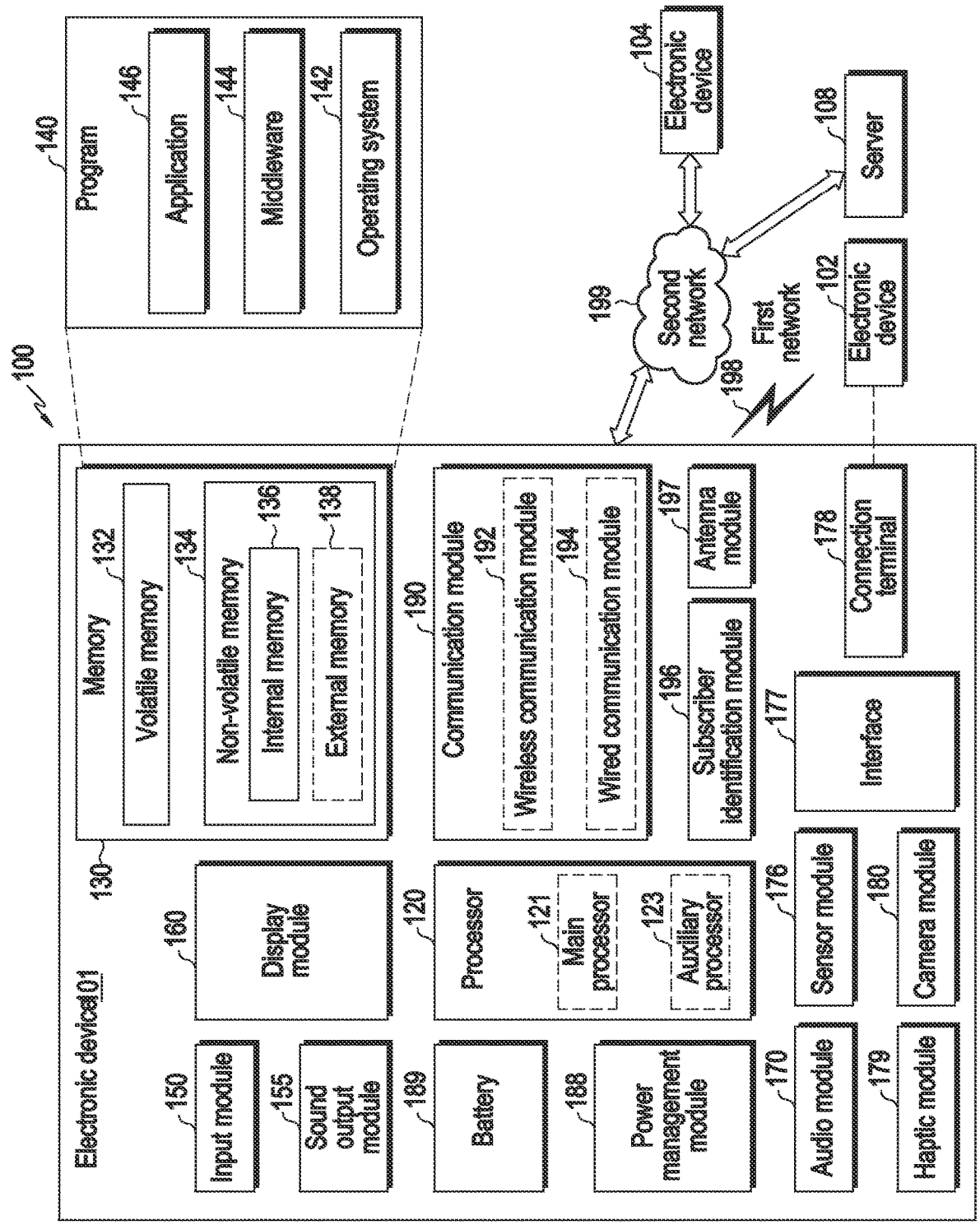
FIG. 1 is a block diagram illustrating an electronic device in a network environment according to various embodiments.

FIG. 1 is a block diagram illustrating an electronic device in a network environment according to various embodiments.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An example of an electronic device 200 is described below according to various embodiments.

Figure 2A:
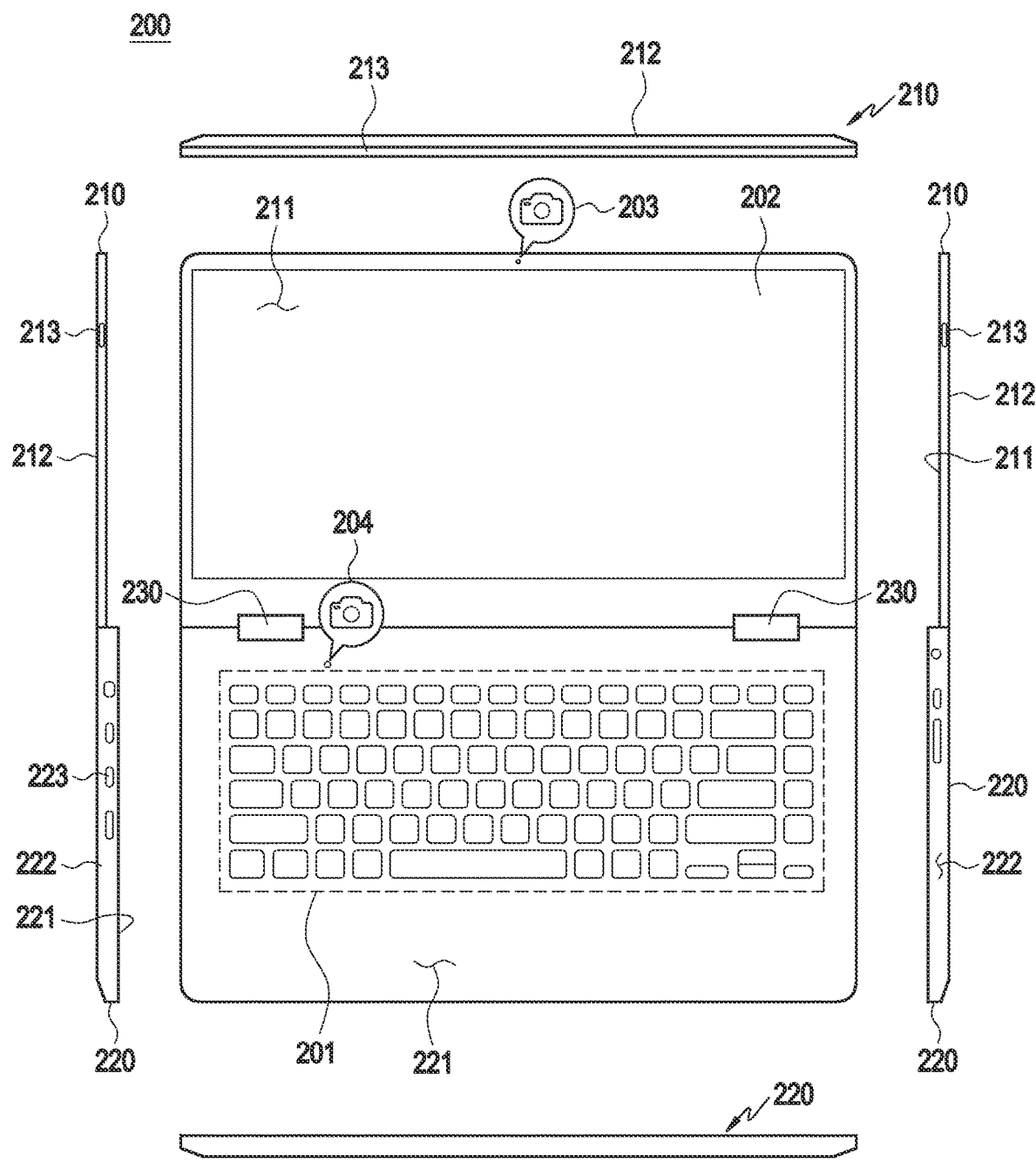
FIG. 2A is a view illustrating an example of an electronic device according to various embodiments.
Figure 2B:
FIG. 2B is a view illustrating an example of an electronic device according to various embodiments.
Figure 2B:
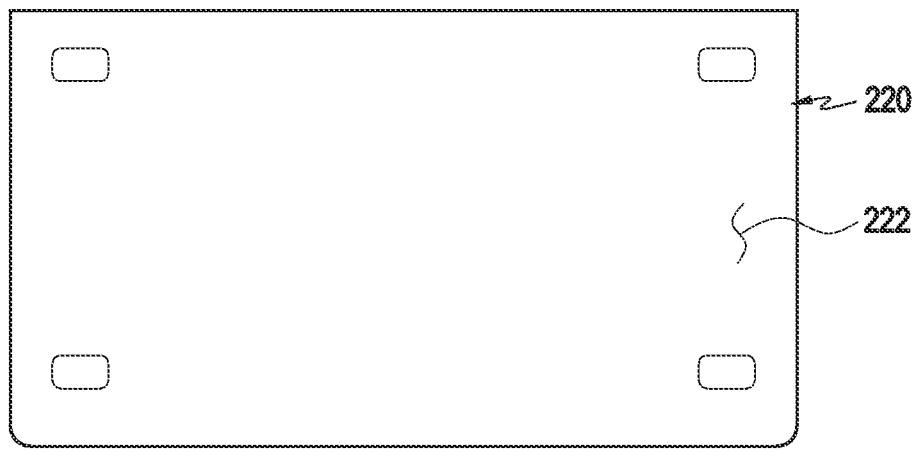

FIG. 2A is a view illustrating an example of an electronic device 200 according to various embodiments. FIG. 2B is a view illustrating an example of an electronic device according to various embodiments. Hereinafter, the electronic device 200 of FIGS. 2A and 2B is described with reference to FIG. 2C. FIG. 2C is a view illustrating rotation of a plurality of housings of an electronic device 200 according to various embodiments.

According to various embodiments, the electronic device 200 may be various types of computers. For example, the electronic device 200 may include a laptop computer including a standard notebook, an ultrabook, a netbook, and a tabbook, a laptop computer, a tablet computer, and a desktop computer. Without being limited thereto, the electronic device 200 may be implemented as various types of electronic devices 200 including housings to be described below and a hinge 230 rotatably connecting the housings and having a plurality of keys 201 arranged on one housing. For example, the electronic device 200 may include a type of electronic device, such as a smart phone or a tabbook.

According to various embodiments, as illustrated in FIGS. 2A and 2B, the electronic device 200 may include housings (e.g., a first housing 210 and a second housing 220) rotatably connected to each other and devices (e.g., a plurality of keys 201, a display 202, and a camera 203) disposed on each of the housings. Without being limited thereto, various types of devices (or hardware) may be disposed on or within the housings in FIGS. 2A and 2B. For example, the devices illustrated in FIG. 1 may be disposed on the (outer surfaces of) housings (e.g., first housing 210 and the second housing 220) or inside the housings (e.g., in an inner space formed by the outer surfaces). Hereinafter, the housings (e.g., the first housing 210 and the second housing 220) provided in the electronic device 200 and examples of the devices disposed on the housings are further described.

According to various embodiments, each of the plurality of housings (e.g., the first housing 210 and the second housing 220) may include a plurality of outer surfaces. For example, referring to FIGS. 2A and 2B, the plurality of outer surfaces of one housing (e.g., the first housing 210 or the second housing 220) may include a first surface 211 or 221 (or an upper surface), a second surface 212 or 222 (or a lower surface) facing in a direction opposite to a direction in which the first surface 211 or 221 faces, and third surfaces 213 or 223 (or side surfaces) positioned between the first surface 211 or 221 and the second surface 212 or 222 and connecting the first surface 211 or 221 and the second surface 212 or 222. The upper surface, the lower surface, and the side surface may be defined in an unfolded state of the housings (e.g., the first housing 210 and the second housing 220) as illustrated in FIG. 2A, but are not limited thereto. A predetermined space (not shown) may be formed inside one housing (e.g., the first housing 210 or the second housing 220) formed by the plurality of outer surfaces (e.g., the upper surface, lower surface, and side surfaces). Meanwhile, without being limited to those illustrated in FIG. 2A, the electronic device 200 may be implemented to include three or more housings.

According to various embodiments, the plurality of housings (e.g., the first housing 210 and the second housing 220) may be rotatably connected by a hinge 230 as illustrated in FIG. 2A. Without being limited to those illustrated in FIG. 2A, the hinge 230 may be implemented in various shapes and structures. For example, the hinge 230 may be implemented as a hinge 230 having an articulated structure. Further, without being limited to those described, the electronic device 200 may be implemented to include a structure for rotatably connecting various types of housings (e.g., the first housing 210 and the second housing 220) other than the above-described hinge 230. Each of the housings may rotate about the hinge 230. For example, if one housing (e.g., the first housing 210) is rotated in one direction (e.g., counter-clockwise) about the hinge 230, an upper surface (e.g., 211) of the one housing (e.g., the first housing 210) and an upper surface (e.g., 221) of the other housing (e.g., the second housing 220) may face each other, and a lower surface (e.g., 212) of the one housing (e.g., the first housing 210) and a lower surface (e.g., 222) of the other housing (e.g., the second housing 220) may face in different directions. As another example, if the one housing (e.g., the first housing 210) is rotated about the hinge 230 in a different direction (e.g., clockwise), the upper surface (e.g., 211) of the one housing (e.g., the first housing 210) and the upper surface (e.g., 221) of the other housing (e.g., the second housing 220) may face in different directions from each other, and the lower surface (e.g., 212) of the one housing (e.g., the first housing 210) and the lower surface (e.g., 222) of the other housing (e.g., the second housing 220) may face each other. Even when the other housing (e.g., the second housing 220) is rotated about the hinge 230, the respective surfaces of the housings (e.g., the first housing 210 and the second housing 220) may face in predetermined directions, as opposed to the case where the one housing (e.g., the first housing 210) is rotated. As at least a portion of the housings is rotated about the hinge 230, a predetermined folding angle may be formed between the housings (e.g., the first housing 210 and the second housing 220). For example, as illustrated in FIG. 2C, the folding angle between the upper surfaces of the housings (e.g., the first housing 210 and the second housing 220) may form an acute angle, an obtuse angle, a flat angle, or an angle larger than the flat angle.

According to various embodiments, devices (e.g., the display 202, the cameras 203 and 204, and a plurality of keys 201) may be disposed on the outer surfaces (e.g., the upper surface, lower surface, or side surfaces) of one housing (e.g., the first housing 210 or the second housing 220) of the electronic device 200 and/or in a predetermined space formed by the outer surfaces.

According to an embodiment, as illustrated in FIG. 2A, the display 202 may be disposed on the one housing (e.g., the first housing 210). The display 202 may be a touchscreen including various sensors (e.g., a touch sensor or a pressure sensor) for sensing the user's input.

According to an embodiment, as illustrated in FIG. 2A, a plurality of keys 201 may be disposed on the other housing (e.g., the second housing 220) than the housing where the display 202 is disposed. For example, various types of keyboards including the plurality of keys 201, such as a membrane keyboard, a pantograph keyboard, a mechanical keyboard, or a flinger keyboard, may be implemented on the housing (e.g., the second housing 220). Each of the plurality of keys 201 may be implemented to correspond to a designated character (or letter, or word, or text), a designated symbol, a designated number, or a designated function. When a specific key among the plurality of keys 201 is pressed by the user, the electronic device 200 may identify a specific character (or letter (e.g., a consonant, such as "ㄱ, ㄴ, ㄷ, . . . , ㅎ", a vowel, such as "ㅏ, ㅑ, . . . , ㅣ", or an English characteristic, such as "a, . . . , z"), a word, or text), a specific number (e.g., "1, . . . , 9"), or a specific function (e.g., "Caps lock" or "Fn") corresponding to the specific key. Meanwhile, without being limited to those shown and/or described, various types of physical keys or electronic keys (e.g., a touchscreen on which electronic keys are displayed) other than the plurality of keys 201 of the keyboard may be implemented on the housing.

In another embodiment, as illustrated in FIG. 2A, the camera 203 or 204 may be disposed on each housing (e.g., the first housing 210 or the second housing 220). For example, at least one camera 203 or 204 may be provided on the respective upper surfaces of the housings (e.g., the first housing 210 and the second housing 220). Meanwhile, without being limited to those shown and/or described, at least one camera may be provided on the respective lower surfaces of the housings (e.g., the first housing 210 and the second housing 220).

Hereinafter, examples of a configuration of the electronic device 200 according to various embodiments are described.

Figure 3A:
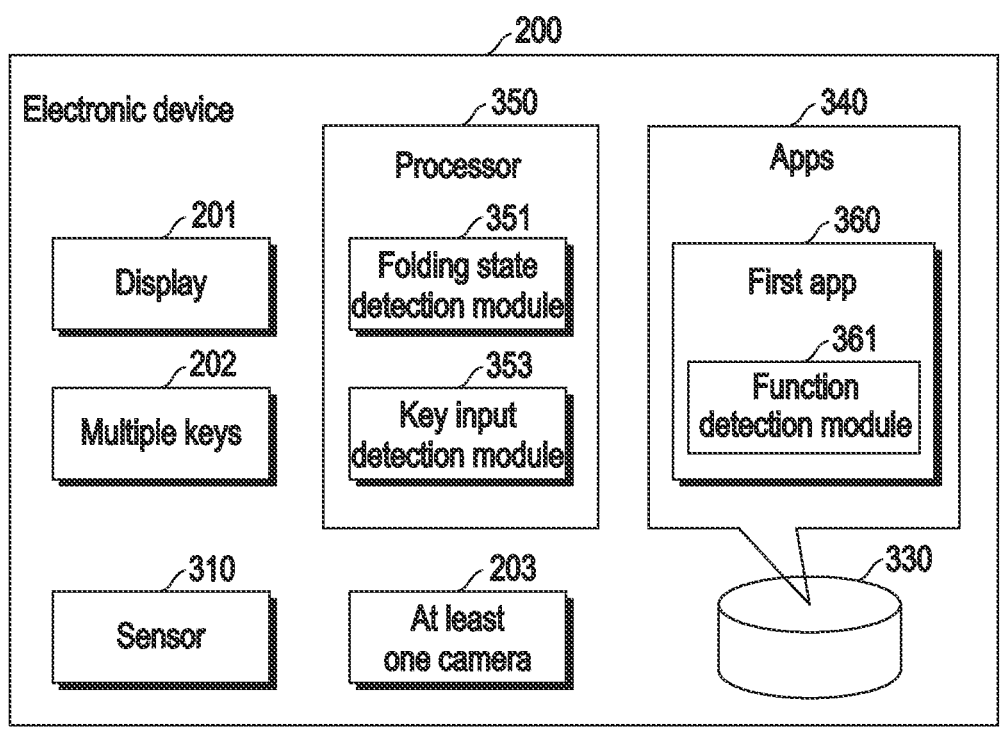
FIG. 3A is a view illustrating an example of a configuration of an electronic device according to various embodiments.
Figure 3B:
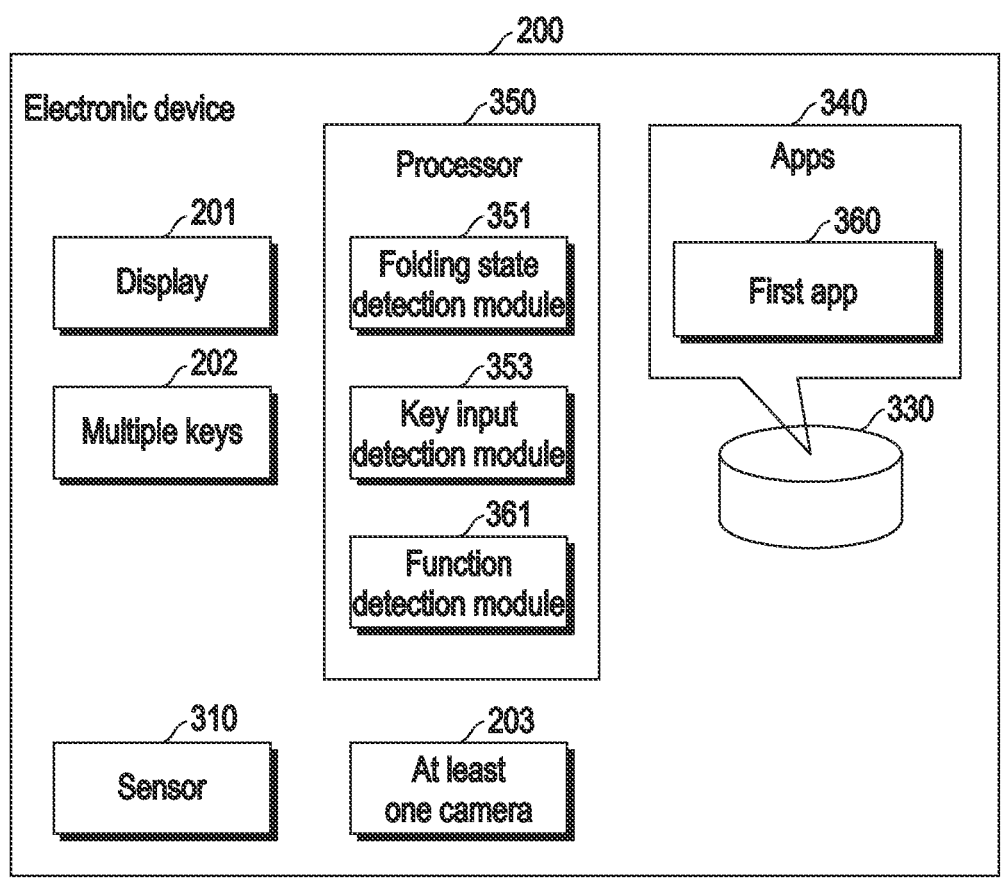
FIG. 3B is a view illustrating another example of a configuration of an electronic device according to various embodiments.

FIG. 3A is a view illustrating an example of a configuration of an electronic device 200 according to various embodiments. FIG. 3B is a view illustrating another example of a configuration of an electronic device 200 according to various embodiments.

However, without being limited to the components illustrated in FIGS. 3A and 3B, the electronic device 200 may be implemented to include more or fewer components than those illustrated in FIGS. 3A and 3B. Hereinafter, information for the positions of the plurality of keys 201 stored in the memory 330 of the electronic device 200 is described with reference to FIG. 4.

Figure 4:
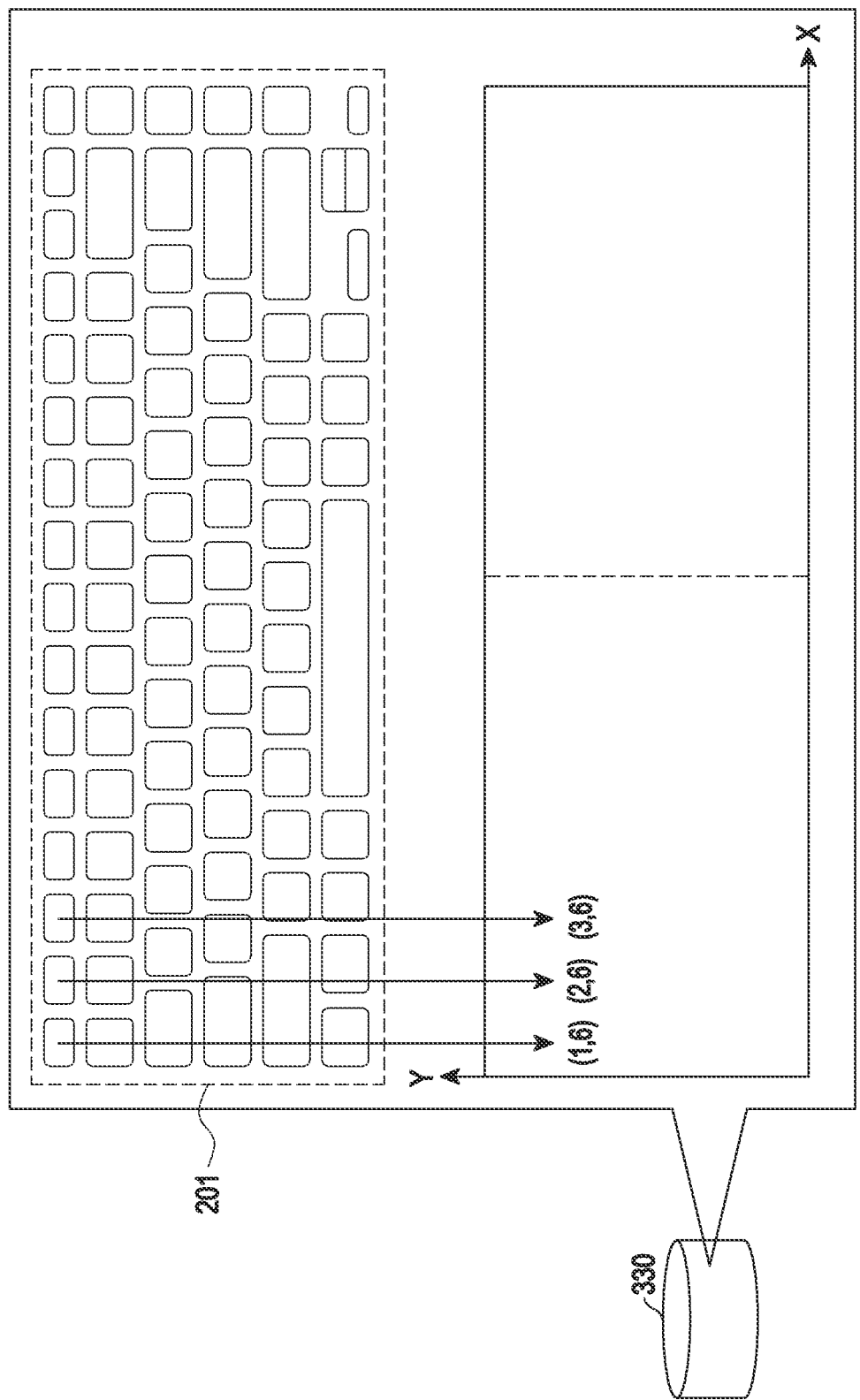
FIG. 4 is a view illustrating an example of information for positions of a plurality of keys according to various embodiments.

FIG. 4 is a view illustrating an example of information for positions of a plurality of keys 201 according to various embodiments.

According to various embodiments, as illustrated in FIG. 3A, the electronic device 200 may include a plurality of keys 201, a display 202, at least one camera 203, a sensor 310, a processor 350 including a folding state detection module 351 and a key input detection module 353, and a memory 330 storing (or having installed thereon) a plurality of applications 340 (e.g., a first application 360) including a function detection module 361. Each component is described below.

According to various embodiments, the display 202 may output various types of content. The various types of content may include, but are not limited to, an execution screen of an application (or program) executed on the electronic device 200, media content, or an image. As described above, the display 202 may be implemented as a touchscreen. The display 202 may be implemented as the display module 160 described in FIG. 1 and may be disposed in the electronic device 200 as described above with reference to FIGS. 2A to 2C. Therefore, no duplicate description is given.

According to various embodiments, the plurality of keys 201 may be hardware keys included in various types of keyboards, such as a membrane keyboard, a pantograph keyboard, a mechanical keyboard, and a flinger keyboard. Each of the plurality of keys 201 may be implemented to correspond to a designated character, a designated symbol, a designated number, or a designated function. When a specific key among the plurality of keys 201 is pressed by the user, the electronic device 200 (e.g., the processor 350) may identify an input corresponding to the specific key. The input may include an electrical signal generated if a specific key is pressed. For example, if each of the plurality of keys 201 is pressed, an electrical signal (e.g., a voltage and/or current generated according to deformation of a capacitor or a voltage and/or current generated according to opening and closing of a switch) may be generated by an electrical element (e.g., a capacitor or a switch) disposed (or electrically connected) to corresponding to each of the plurality of keys 201. The electrical signal may be transferred from each of the plurality of keys 201 to the processor 350 through a signal line electrically connecting each of the plurality of keys 201 and the processor 350. The processor 350 (e.g., a micro controller (MCU)) may identify the specific key corresponding to the signal line (or obtain identification information for the specific key) based on identifying an electrical signal from the signal line and identify information for the specific key. The information for the specific key may include a specific character (or letter (e.g., a consonant, such as "ㄱ, ㄴ, ㄷ, . . . , ㅎ", a vowel, such as "ㅏ, ㅑ, . . . , ㅣ", or an English characteristic, such as "a, . . . , z"), a word, or text), a specific number (e.g., "1, . . . , 9"), or a specific function (e.g., "Caps lock" or "Fn") corresponding to the specific key. Meanwhile, as described above, various types of physical keys or electronic keys (e.g., a touchscreen on which electronic keys are displayed) other than the plurality of keys 201 of the keyboard may be implemented on the housing.

According to various embodiments, the at least one camera 203 may capture a still image (or an image) and a video. The at least one camera 203 may include one or more lenses, image sensors, image signal processors, or flashes. The at least one camera 203 may include a plurality of camera modules each having different attributes or functions (or uses). For example, the at least one camera 203 may include cameras having different angles of view. Examples of the angles of view may include super wide angles of 114° to 94°, wide angles, normal lens angles of 84° to 63°, telephoto angles of 28° to 8°, and super telephoto angles of 6° to 3°. The at least one camera 203 may be implemented as the camera module 180 described in FIG. 1 and may be disposed in the electronic device 200 as described above with reference to FIGS. 2A to 2C. Therefore, no duplicate description is given.

According to various embodiments, the sensor 310 may be provided to detect (or obtain, identify, or sense) information and/or data (e.g., an electrical value or electrical signal) for identifying the folding state of the electronic device 200. The sensor 310 may include, but is not limited to, a Hall-sensor, an angle sensor, a strain sensor, a distance sensor, or a gyroscope sensor (or a tilt sensor). Although not shown, a sensor hub implemented to gather information and/or data detected using the sensor 310 and a sensor hub driver IC for managing information and/or data received from the sensor 310 may be further implemented in the electronic device 200.

The processor 350 is described below. For example, the processor 350 may include one or more of, e.g., a central processing unit, an application processor, a graphic processing device, an image signal processing, a sensor hub processor, or a communication processor. The central processing unit may include a small central processing unit, such as a microcomputer. Since the processor 350 may be implemented as the processor 120 of FIG. 1 described above, a redundant description will be omitted.

According to various embodiments, Various modules included in the processor 350 of the electronic device 200 (e.g., the folding state detection module 351 and the key input detection module 353) may be implemented (e.g., executed) in software, firmware, hardware, or in a combination of at least two or more thereof. For example, the modules in the form of an application, program, computer code, instructions, routine, or process executable by the processor 350 of the electronic device 200 may be stored in the electronic device 200. When the modules are executed by the processor 350, the modules may cause the processor 350 to perform an operation associated with the module. Or, without being limited to what is described and/or shown, each module may be implemented as a separate hardware processor 350 from the processor 350. Each module is described below.

First, the folding state detection module 351 is described.

According to various embodiments, the folding state detection module 351 may identify information for the folding state of the electronic device 200 based on information and/or data (e.g., an electrical value or electrical signal) identified using the sensor 310. The information for the folding state of the electronic device 200 may include at least one of information indicating a state, such as contact or non-contact between the housings (e.g., the first housing 210 and the second housing 220), information for the folding angle between the housings, or information for the angle range including the folding angle between the housings. The folding state detection module 351 may identify information for the folding state corresponding to the information and/or data (e.g., an electrical value or electrical signal) identified using the sensor 310. In an embodiment, the folding state detection module 351 may identify that the two housings are not in contact with each other upon identifying a low-level value or signal using the Hall-sensor and identify that the two housings are in contact with each other upon identifying a high-level value or signal but, without being limited thereto, perform the identification operation in the opposite manner. In an embodiment, upon identifying a value or signal of a specific level (e.g., identifying a slope value) using the gyroscope sensor, the folding state detection module 351 may identify the folding angle value corresponding to the identified value or signal of the specific level. Further, without being limited thereto, the folding state detection module 351 may use the slope value itself, as the value indicating the folding angle, instead of identifying the folding angle value. As described below, upon identifying information for the folding state indicating that the folding angle is included in the specific angle range, the electronic device 200 may perform a function of a specific application (or provide or execute the function) corresponding to an input identified using the plurality of keys 201.

The key input detection module 353 is described below.

According to various embodiments, the key input detection module 353 may execute a function of a specific application based on at least one input identified (or received) using at least some of the plurality of keys 201. For example, if the folding angle identified by the folding state detection module 351 is included in a designated angle range (e.g., a range of 180 degrees or more), the key input detection module 353 may identify the code corresponding to at least one input identified using at least some of the plurality of keys 201 and control the application to perform the function corresponding to the identified code (or execute or provide the function). The code may include a scan code. The code is a kind of identifier for identifying the function of the application and may be composed of numbers or characters. However, without being limited thereto, other various types of identifiers than the code may be used instead of the code. In an embodiment, the key input detection module 353 may identify at least one key corresponding to at least one identified input (e.g., obtain identification information for the key) and, as described below, identify the code corresponding to the identified key based on pre-stored information for per-input codes. The key input detection module 353 may transfer the identified code to the currently running application (e.g., the first application 360 (or program)) among the plurality of applications 340. Although not shown, the identified code may also be transferred to the running application 360 through a keyboard driver by the operating system (OS). The application 360 may be an application implemented to identify the function corresponding to the code and perform the identified function using a function detection module 361. The function detection module 361 may be a program, computer code, instructions, routine, or process implemented in the application to enable the application to perform the function corresponding to the received code among the plurality of functions of the application. In other words, if a specific application (e.g., the first application 360) is implemented to include the function detection module 361, the specific application (e.g., the first application 360) may support the operation of performing the function corresponding to the received code. Meanwhile, without being limited to those described, the key input detection module 353 may be implemented to transfer identification information for the identified key to the application so that the function detection module 361 of the application identifies the code and/or function based on the key identification information. Further, without being limited thereto, according to various embodiments, the electronic device 200 (e.g., the processor 350) may be implemented to include the function detection module 361 as illustrated in FIG. 3B. The electronic device 200 (e.g., the processor 350) may previously store, in the memory 330, information for the code corresponding to each of the plurality of functions providable by the specific application, identify the function of the specific application corresponding to the identified code using the key input detection module 353, using the function detection module 361, and control the specific application to perform the function (e.g., provide instructions for performing the function).

According to various embodiments, the key input detection module 353 may identify information for at least one position corresponding to at least one identified input using at least one of the plurality of keys 201 and identify the code and/or function corresponding to the at least one identified position. For example, the electronic device 200 may previously store position information for each of the plurality of keys 201 in the memory 330 and identify position information for at least one key corresponding to at least one received input based on the stored information. In an embodiment, as illustrated in FIG. 4, the electronic device 200 may previously store information 400 for two-dimensional coordinates (e.g., the x coordinate and the y coordinate) of the plurality of keys 201 in the memory 330. Without being limited to those described and/or shown, the memory 330 storing the two-dimensional coordinates may be implemented in the processor 350 (e.g., a microcomputer). For example, the two-dimensional coordinates of one of the plurality of keys 201 may be determined depending on the position in which the key is disposed in the horizontal and vertical directions. As an example, if a first key is positioned on the first line in the horizontal direction (e.g., the x direction), the x coordinate of the first key may be 1 and, if the first key is positioned on the sixth line in the vertical direction (e.g., the y direction), the y coordinate of the first key may be 6. The coordinates described may be varied depending on the type of the axes and the position of the origin and, thus, are not limited thereto. The electronic device 200 may identify at least one key corresponding to at least one identified input and identify at least one coordinate information for at least one identified key based on the information 400 for the coordinates of each of the plurality of keys 201. The electronic device 200 may identify the code and/or function based on at least one identified coordinate information, and this is described below with reference to FIGS. 10A and 10B. The electronic device 200 may set (or identify or define) an area based on information for the coordinates of each key. For example, the electronic device 200 may set a first area from specific coordinates (e.g., (0,0)) to the outermost edge including other specific coordinates (e.g., (6,6)). Thus, if an input for a first key is identified, the electronic device 200 may identify that an input occurs in the first area.

According to various embodiments, if a designated condition is met, the key input detection module 353 may perform the operation of executing a function of the specific application. Meeting the designated condition may include at least one of when the folding angle is included in a specific angle range (e.g., 180 degrees or more) or when the specific application is running (e.g., when a designated type of application (e.g., the camera (203) application) is running or when an application including the above-described function detection module 361 is running) The specific angle range may be, e.g., a range of 180 degrees or more but, without being limited thereto, may be set to various angle ranges (e.g., set automatically by the electronic device 200 or by the user).

An example of an operation of an electronic device 200 is described below according to various embodiments.

According to various embodiments, if the folding angle between the housings (e.g., the first housing 210 and the second housing 220) is included in a designated angle range, and the specific application is running (e.g., a specific type of application (e.g., the camera (203) application) is running or the application including the above-described function detection module 361 is running), the electronic device 200 may perform the function of the specific application (e.g., the camera (203) application) corresponding to at least one identified input using at least some of the plurality of keys 201.

Figure 5:
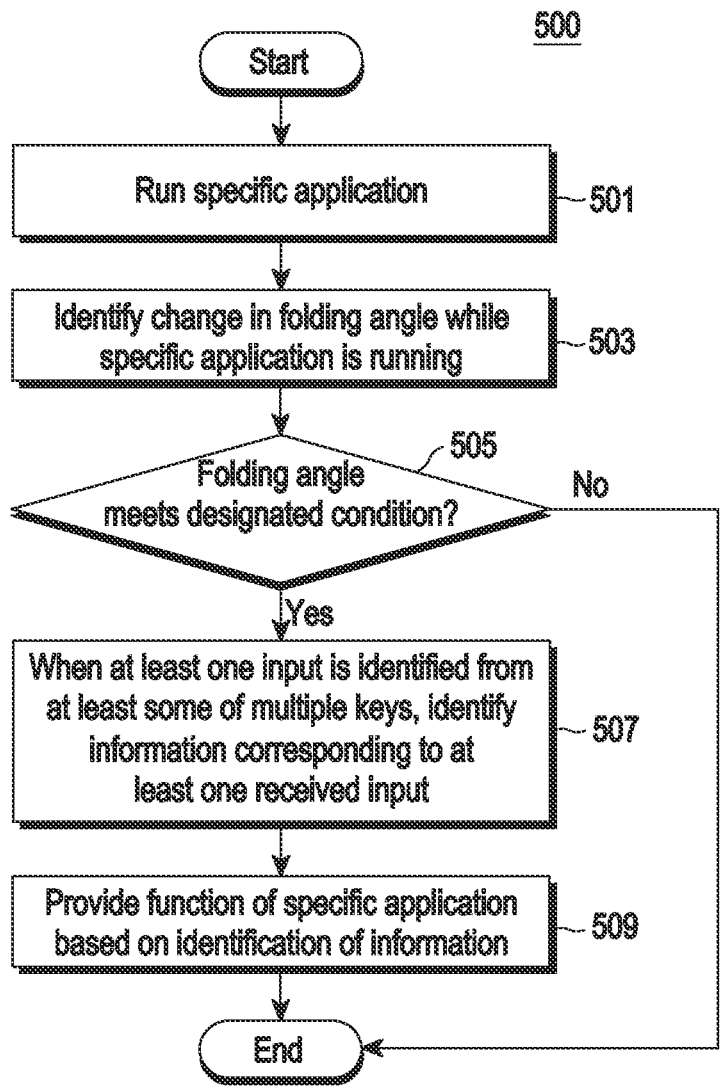
FIG. 5 is a flowchart illustrating an example of an operation of an electronic device according to various embodiments.

FIG. 5 is a flowchart 500 illustrating an example of an operation of an electronic device 200 according to various embodiments. The operations shown in FIG. 5 are not limited to the shown order but may rather be performed in other various orders. According to various embodiments, more or less operations than those of FIG. 5 may be performed. FIG. 5 is described below with reference to FIGS. 6 and 7A and 7B.

Figure 6:
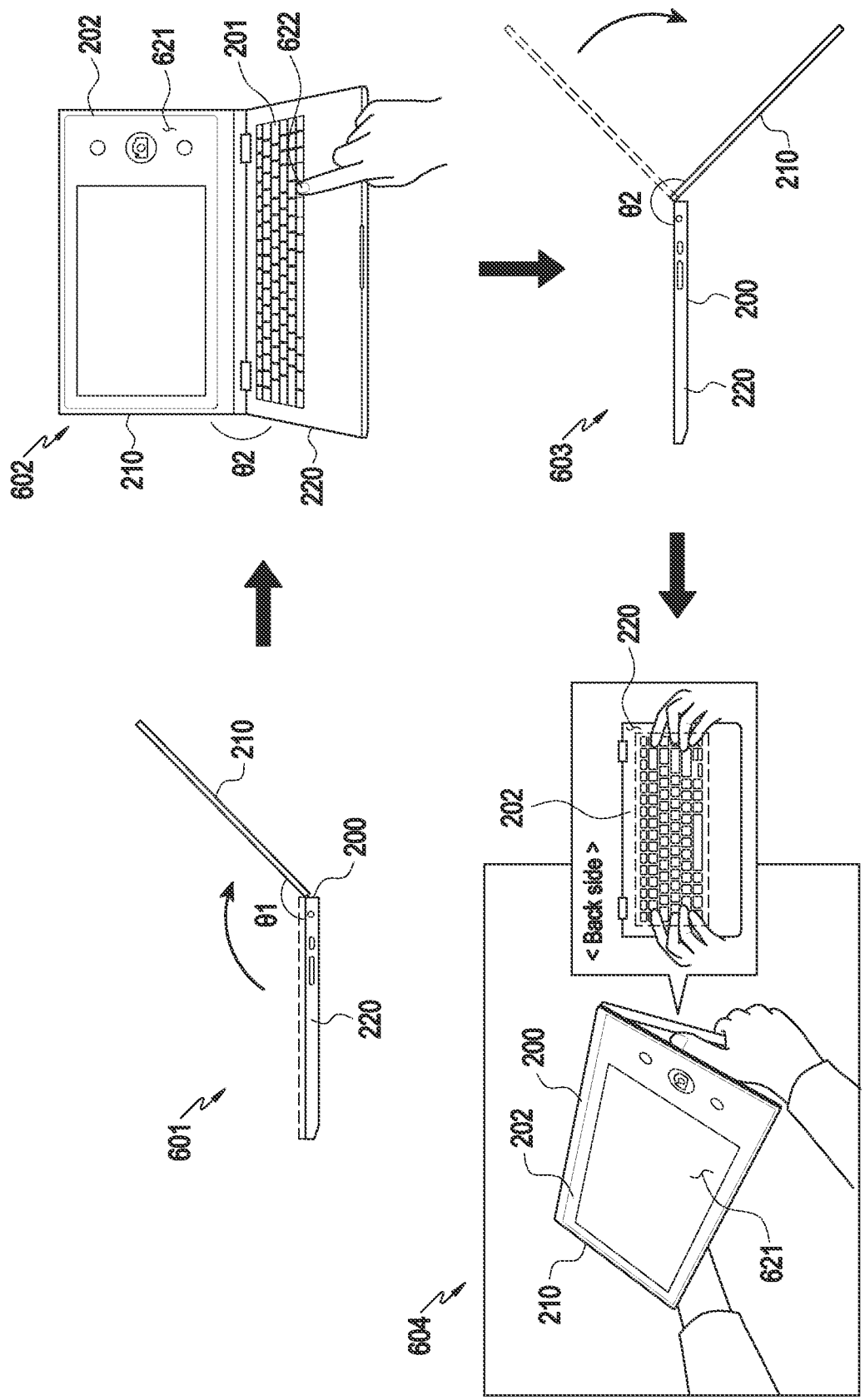
FIG. 6 is a view illustrating an example of an operation of identifying at least one input using at least some of a plurality of keys according to a change in a folding angle of an electronic device according to various embodiments.
Figure 7A:
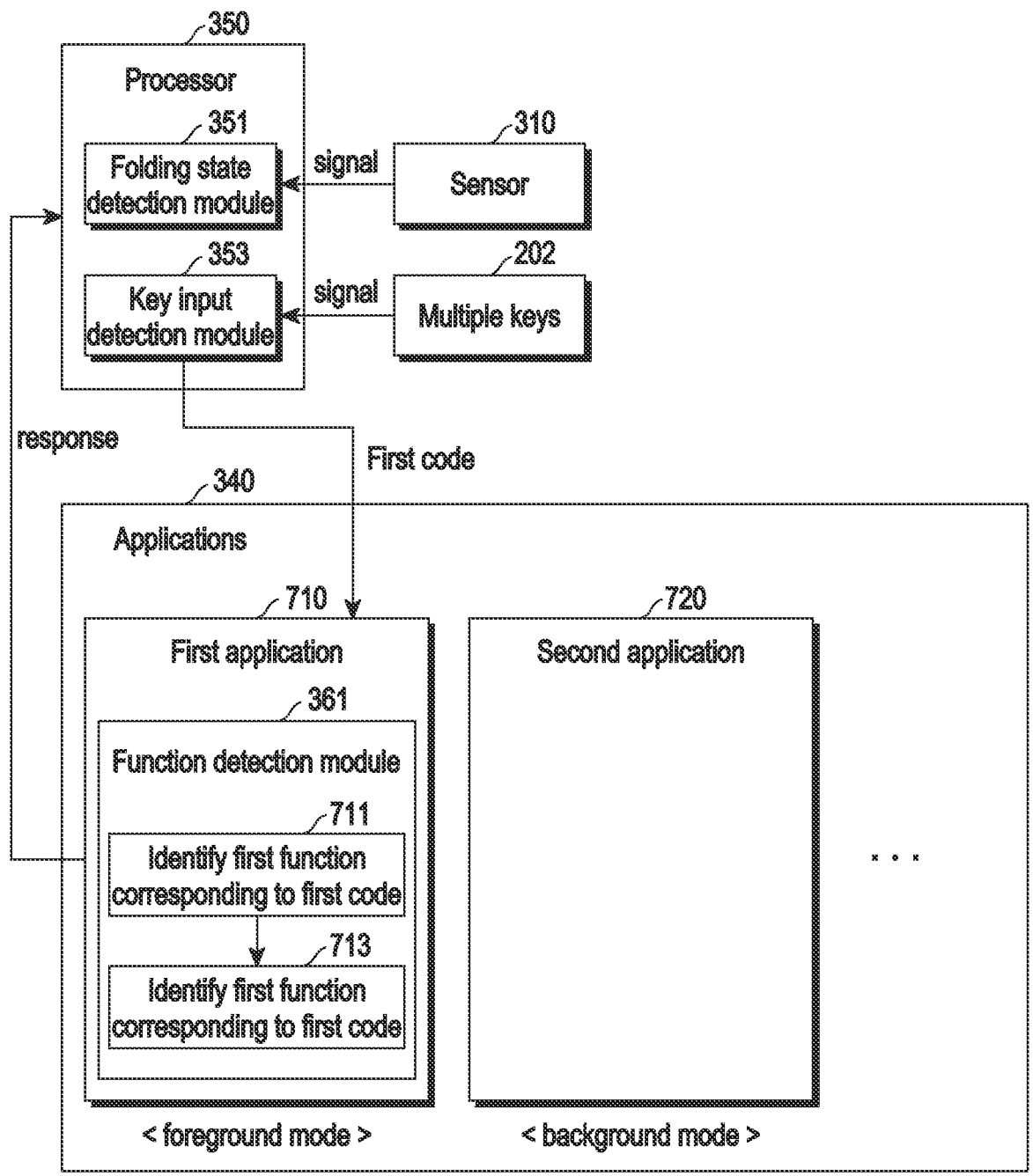
FIG. 7A is a view illustrating an example of an operation of providing a function corresponding to at least one identified input of an electronic device (e.g., a processor) according to various embodiments.
Figure 7B:
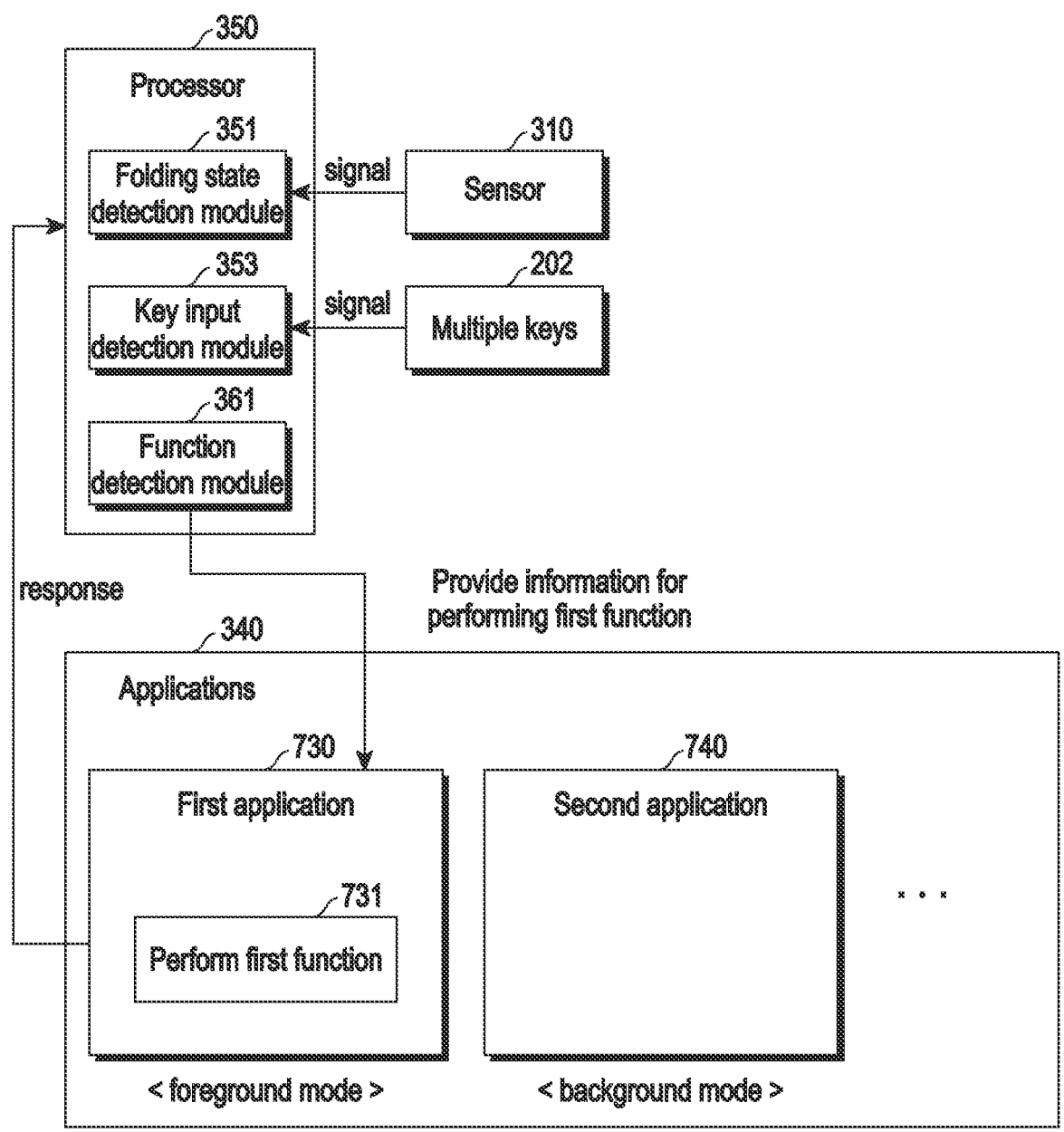
FIG. 7B is a view illustrating another example of an operation of providing a function corresponding to at least one identified input of an electronic device (e.g., a processor) according to various embodiments.

FIG. 6 is a view illustrating an example of an operation of identifying at least one input using at least some of a plurality of keys 201 according to a change in a folding angle of an electronic device 200 according to various embodiments. FIG. 7A is a view illustrating an example of an operation of providing a function corresponding to at least one identified input of an electronic device 200 (e.g., a processor 350) according to various embodiments. FIG. 7B is a view illustrating another example of an operation of providing a function corresponding to at least one identified input of an electronic device 200 (e.g., a processor 350) according to various embodiments.

According to various embodiments, the electronic device 200 may execute a specific application in operation 501. For example, as illustrated in 601 of FIG. 6, as at least one (e.g., the first housing 210) of a plurality of housings (e.g., the first housing 210 and the second housing 220) is rotated about the hinge 230 in one direction (e.g., clockwise), a predetermined folding angle (a first angle Θ1) (e.g., an acute angle or an obtuse angle) may be formed between the two housings (e.g., the first housing 210 and the second housing 220). In a state in which the predetermined folding angle (the first angle Θ1) is formed between the plurality of housings (e.g., the first housing 210 and the second housing 220), the electronic device 200 may execute the specific application (e.g., a camera application) and display an execution screen 621 of the specific application on the display 202. The execution screen 621 of the specific application may include at least one icon for providing the function of the specific application and, when one of the icons is touched, the function corresponding to the touched icon may be performed.

According to various embodiments, the specific application executable on the electronic device 200 may include an application including the above-described function detection module 361 (or an application supporting the operation of detecting and performing the function corresponding to the identified input).

According to various embodiments, in operation 503, the electronic device 200 may identify a change in the folding angle while the specific application is running and, in operation 505, identify whether the folding angle meets a designated condition. For example, as illustrated in 602 and 603 of FIG. 6, at least one of the two housings (e.g., the first housing 210 and the second housing 220) may be rotated about the hinge 230. As illustrated in FIGS. 7A and 7B, the electronic device 200 may identify information (e.g., an electrical value or signal) using the sensor 310 when part of the housings (e.g., the first housing 210 and the second housing 220) is rotated (or while rotated) and identify the changed folding angle (or changing folding angle) (e.g., a second angle Θ2) between the two housings based on the identified information. The electronic device 200 may determine whether the identified folding angle (e.g., the second angle Θ2) is included in a designated angle range (e.g., 180 degrees or more) and, if the folding angle is included in the designated angle range, identify that the folding angle meets the designated condition while, unless the folding angle is included in the designated angle range (or when it is identified as included in another angle range (e.g., 180 degrees or less)), the electronic device 200 may identify that the folding angle does not meet the designated condition. Without being limited to those described, the designated angle range may be set to various value ranges, and the value in the angle range may be adjusted by the electronic device 200 and/or the user.

According to various embodiments, in a case where the folding angle meets the designated condition, if at least one input is received from at least some of the plurality of keys in operation 507, the electronic device 200 may identify information corresponding to the at least one received input and, in operation 509, provide the function of the specific application based on the identification of the information. For example, as illustrated in 604 of FIG. 6, while the folding angle (e.g., the second angle Θ2) is included in the designated angle range (e.g., 180 degrees or more), and the specific application (e.g., the camera application) is running, at least some of the plurality of keys 201 may be pressed by the user. As described above, if at least one of the plurality of keys 201 are pressed, the electronic device 200 (e.g., the processor 350) may identify at least one electrical signal (e.g., identify a voltage and/or current generated by an electrical element) as illustrated in FIGS. 7A and 7B. The electronic device 200 may refrain from (or block) the operation of identifying information (e.g., a character, symbol, or function) for at least one of the plurality of keys 201 pressed based on at least one identified electrical signal and perform (or execute or provide) the function of the specific application (e.g., the camera (203) application) based on the at least one identified electrical signal.

According to various embodiments, the electronic device 200 may identify whether the electronic device 200 is gripped using a sensor, such as an acceleration sensor and, if the electronic device 200 is gripped, refrain from (or block) the operation of identifying information (e.g., a character, symbol, or function) for at least one of the plurality of keys 201 pressed based on the at least one identified electrical signal, and perform (or execute or provide) the function of the specific application (e.g., the camera application) based on the at least one identified electrical signal. However, embodiments are not limited thereto.

Hereinafter, examples of the operation of performing the function of the electronic device 200 are described according to the above-described implementation examples of FIGS. 3A and 3B.

As described above in connection with FIG. 3A, an example of the operation of the electronic device 200 when the processor 350 includes the folding state detection module 351 and the key input detection module 353 is described below.

According to various embodiments, if the at least one electrical signal is identified in a state in which the current folding angle is included in a designated angle range as illustrated in FIG. 7A, the electronic device 200 (e.g., the processor 350) may identify the code (e.g., the first code) corresponding to at least one electrical signal. The electronic device 200 may transfer the identified code (e.g., the first code) to the specific application (e.g., the first application 710), which is currently running in the foreground mode, among the plurality of applications 340 (and/or programs) (e.g., the first application 710 and the second application 720) which are running on the electronic device 200. The function detection module 361 of the specific application (e.g., the first application 710) may identify (711) a first function (e.g., capture, zoom-in, or zoom-out) corresponding to the received code based on information for the function for each of the plurality of codes as described above and perform (713) the identified first function. The processor 350 may control at least one device (e.g., the camera 203) based on the execution of the first function of the first application 710 (e.g., perform a read-out operation of the image sensor, change to a camera with a larger angle of view and capture, or change to a camera with a smaller angle of view and capture). Without being limited thereto, zoom-in or zoom-out may be performed in software.

According to various embodiments, the electronic device 200 (e.g., the processor 350) may determine whether the application (e.g., the first application 710) running in the foreground mode supports the operation of performing the function corresponding to the received code (hereinafter, a function execution operation) and, if it is determined as supporting the function execution operation, transfer the code to the application running in the foreground mode. In an embodiment, the electronic device 200 (e.g., the processor 350) may previously store information for a list of various types of applications supporting the function execution operation and may determine whether the application (e.g., the first application 710) currently running in the foreground mode supports the function execution operation based on the stored information. For example, if the currently running application is included in the list, the electronic device 200 may determine that the running application supports the corresponding operation. In another embodiment, the electronic device 200 determines whether the application supports the function execution operation with reference to information for the application (e.g., the first application 710) currently running in the foreground mode. For example, the information for the application may include information indicating that the operation of detecting and performing the function may be performed by the creator of the application. In another embodiment, the electronic device 200 (e.g., the processor 350) may identify whether the application (e.g., the first application 710) includes the function detection module 361 and may determine whether the application (e.g., the first application 710) supports the function execution operation depending on whether the function detection module 361 is included (e.g., if the function detection module 361 is included, determines that the application supports the function execution operation). For example, the function detection module 361 may be implemented to return response information (e.g., a response code or a response message) in response to reception of a designated code. The electronic device 200 may transfer the designated code to the application (e.g., the first application 710), identify the information returned from the application and, if the identified information includes the response information, identify that the application includes the function detection module 361. Meanwhile, without being limited thereto, the electronic device 200 may transfer the code to the application without performing the operation of determining whether the application supports the function execution operation.

According to various embodiments, if the plurality of applications are running in the foreground mode, the electronic device 200 (e.g., the processor 350) may transfer the code to the application having the highest priority among the plurality of applications. In an embodiment, the priority may be set to be higher as the application is more recently controlled (e.g., the execution screen is touched). In another embodiment, the priority may be set to differ for each type of application. For example, the media application or camera application which consumes more resources may be set to have a higher priority.

As described above in connection with FIG. 3B, an example of the operation of the electronic device 200 when the processor 350 includes the folding state detection module 351, the key input detection module 353, and the function detection module 361 is described below.

According to various embodiments, if the at least one electrical signal is identified in a state in which the current folding angle is included in a designated angle range as illustrated in FIG. 7B, the electronic device 200 (e.g., the processor 350) may identify the function (e.g., the first function) corresponding to at least one electrical signal using the function detection module 361. In an embodiment, the electronic device 200 (e.g., the processor 350) may previously store information for code for each of a plurality of functions for various types of applications. The electronic device 200 (e.g., the processor 350) may identify the application (e.g., the first application 730) running in the foreground mode among a plurality of currently running applications 340 (and/or programs) (e.g., the first application 730 and the second application 740) based on pre-stored information and identify information for the corresponding code for each of a plurality of functions for the identified application (e.g., the first application 730). The electronic device 200 (e.g., the processor 350) may identify the code corresponding to at least one electrical signal. The electronic device 200 (e.g., the processor 350) may identify the function (e.g., the first function) corresponding to the identified code among the plurality of functions providable by the application (e.g., the first application 730) based on the pre-stored information for the code for each of the plurality of functions providable by the application (e.g., the first application 730). Based on the identification of the first function, the electronic device 200 (e.g., the processor 350) may control the application (e.g., the first application 730) running in the foreground mode to perform the first function. For example, the electronic device 200 (e.g., the processor 350) may transfer information (e.g., instructions or code), which causes the first application 730 to perform the first function, to the first application 730. The first application 730 may perform the first function based on reception of the information (e.g., instructions or code). The processor 350 may control at least one device (e.g., the camera 203) based on the execution of the first function of the first application 730 (e.g., perform a read-out operation of the image sensor 310, change to a camera 203 with a larger angle of view and capture, or change to a camera 203 with a smaller angle of view and capture).

Further, according to various embodiments, if the folding angle does not meet a designated condition, the electronic device 200 may identify a specific character, a specific symbol, or a specific function based on at least one identified input. For example, if at least one input (e.g., 622) is identified using at least some of the plurality of keys 201 in a state in which the application (e.g., the camera (203) application) is running, and the angle between the housings is not included in a designated angle range (or in a state in which it is included in a different angle range) (e.g., the folding angle (the first angle Θ1) is 180 degrees or less as illustrated in 602 of FIG. 6), the processor 350 may identify at least one character, symbol, or function corresponding to the at least one identified input.

An example of an operation of an electronic device 200 is described below according to various embodiments.

According to various embodiments, if the folding angle between the housings (e.g., the first housing 210 and the second housing 220) is included in a designated angle range, and the specific application is running (e.g., a specific type of application (e.g., the camera application) is running or the application including the above-described function detection module 361 is running), the electronic device 200 may identify at least one input using at least some of the plurality of keys 201. Based on the identification of the at least one input, the electronic device 200 may identify position information (e.g., coordinate information) for at least some of the plurality of keys 201 and identify the code corresponding to the identified position information.

Figure 8:
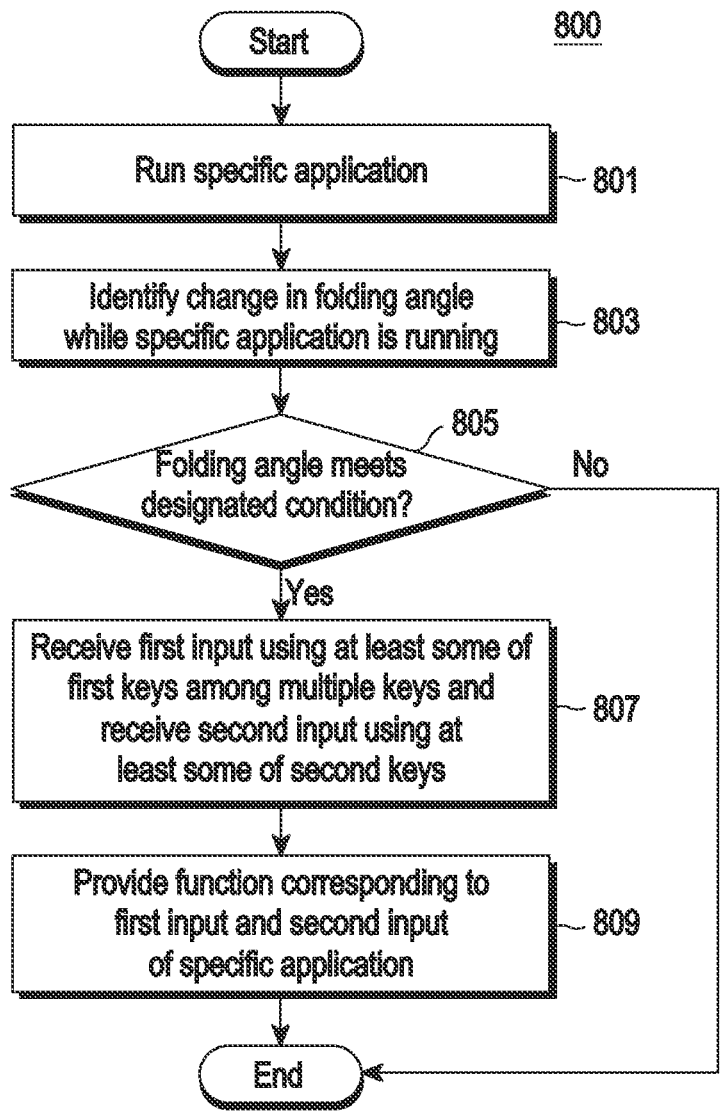
FIG. 8 is a flowchart illustrating an example of an operation of an electronic device according to various embodiments.

FIG. 8 is a flowchart 800 illustrating an example of an operation of an electronic device 200 according to various embodiments. The operations shown in FIG. 8 are not limited to the shown order but may rather be performed in other various orders. According to various embodiments, more or less operations than those of FIG. 8 may be performed. FIG. 8 is described below with reference to FIGS. 9, 10A and 10B, and 11.

Figure 9:
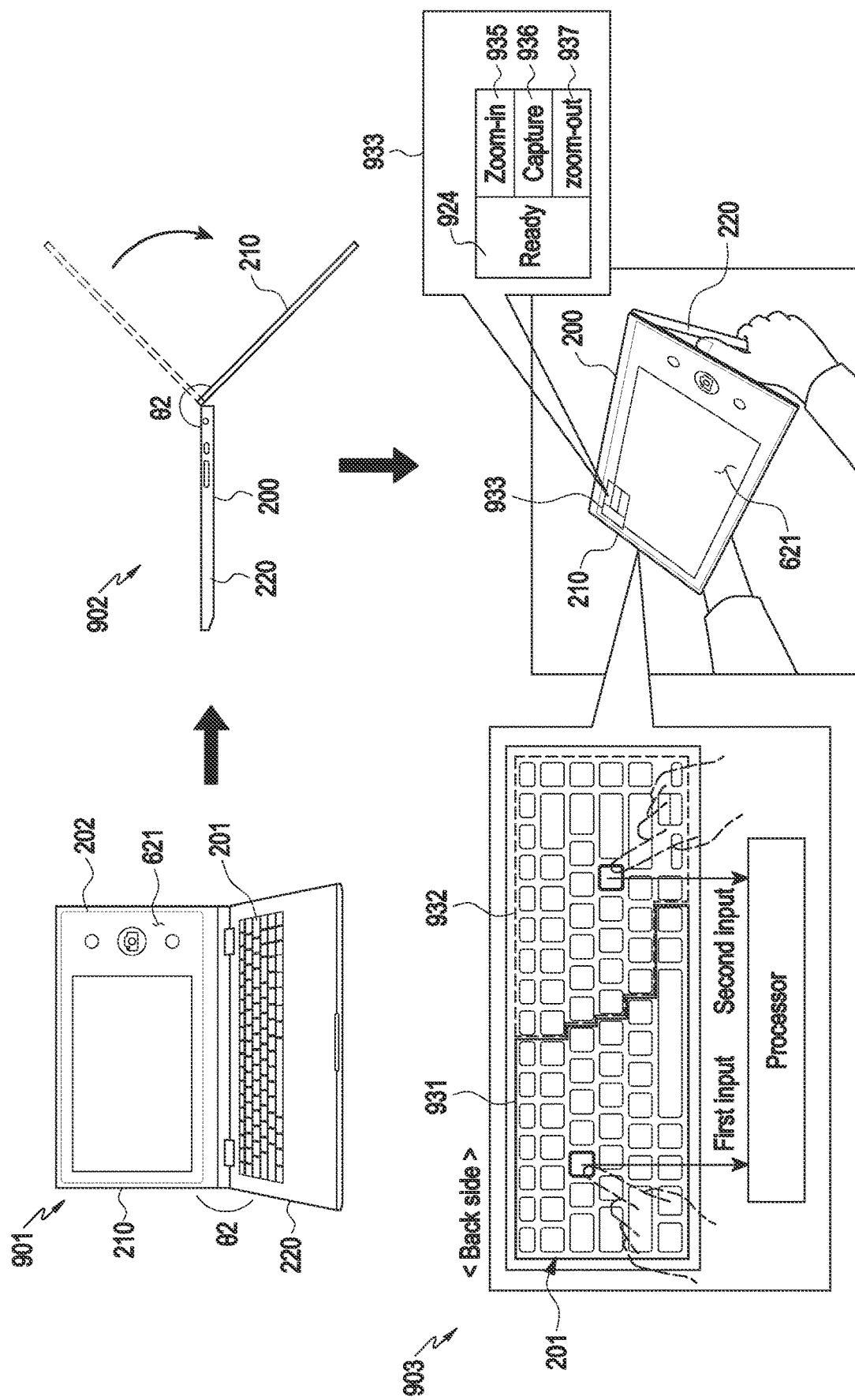
FIG. 9 is a view illustrating an example of an operation of identifying at least one input using at least some of a plurality of keys according to a change in a folding angle of an electronic device according to various embodiments.
Figure 10A:
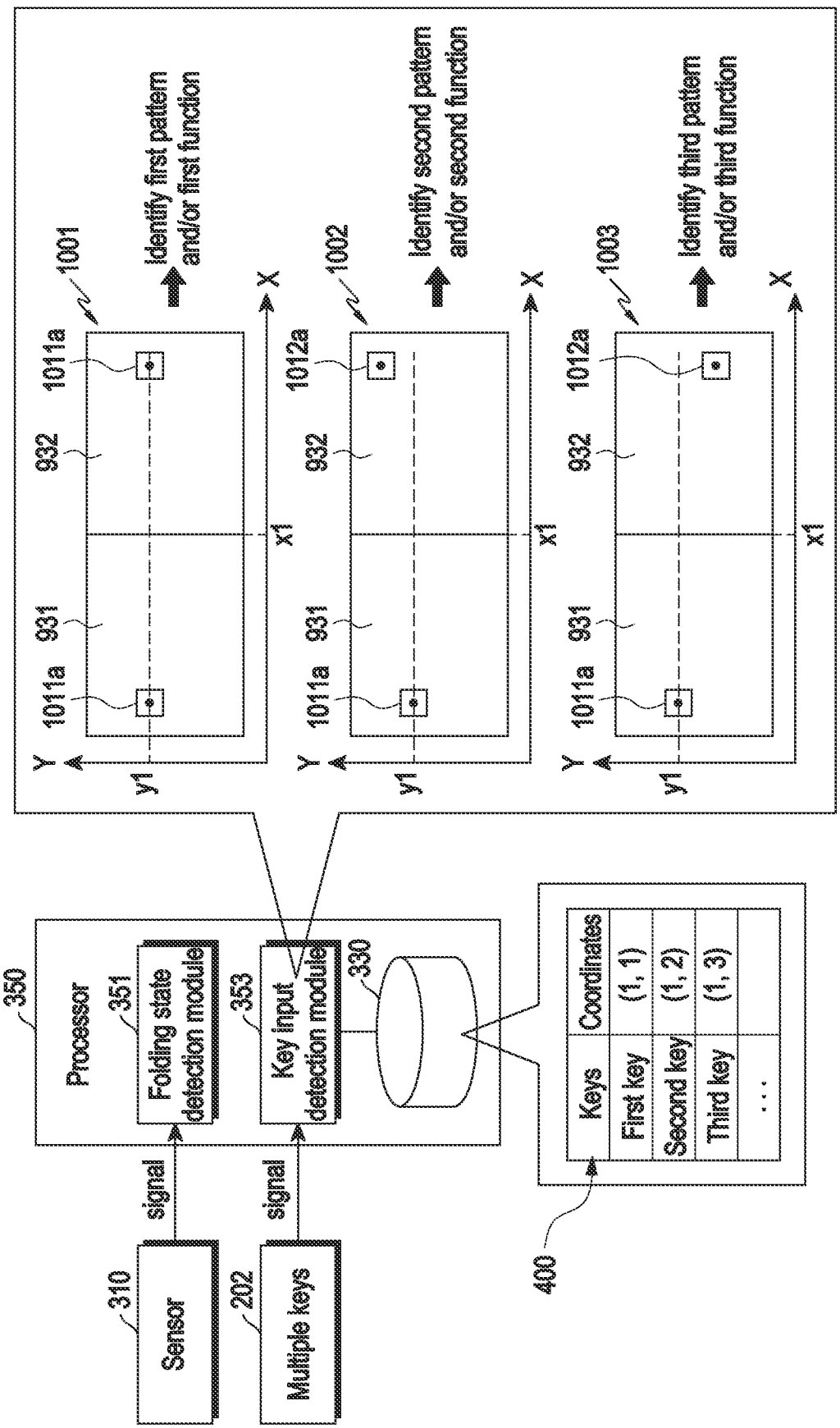
FIG. 10A is a view illustrating an example of an operation of identifying a pattern corresponding to at least one identified input of an electronic device (e.g., a processor) according to various embodiments.
Figure 10B:
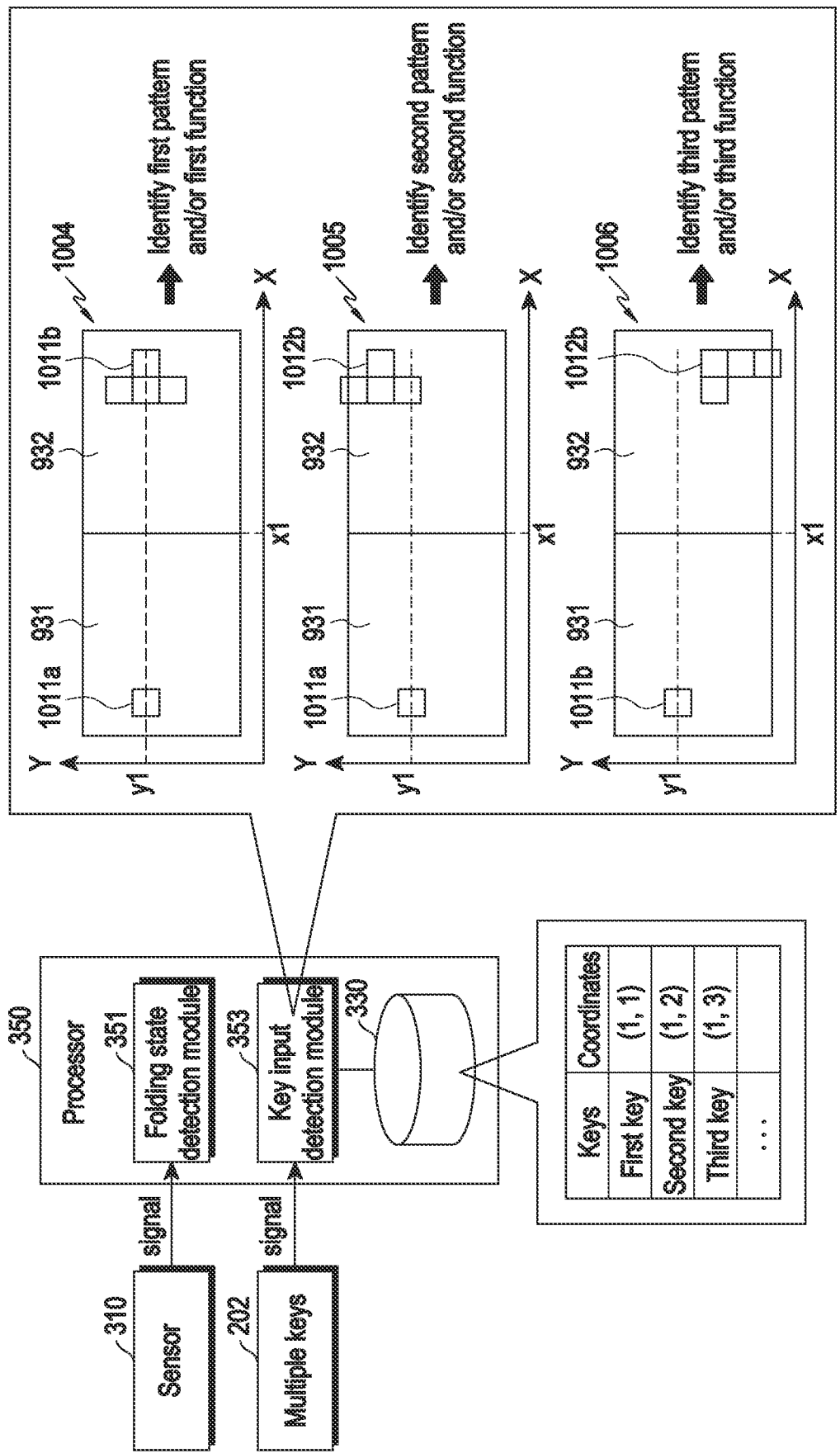
FIG. 10B is a view illustrating another example of an operation of identifying a pattern corresponding to at least one identified input of an electronic device (e.g., a processor) according to various embodiments.
Figure 11:
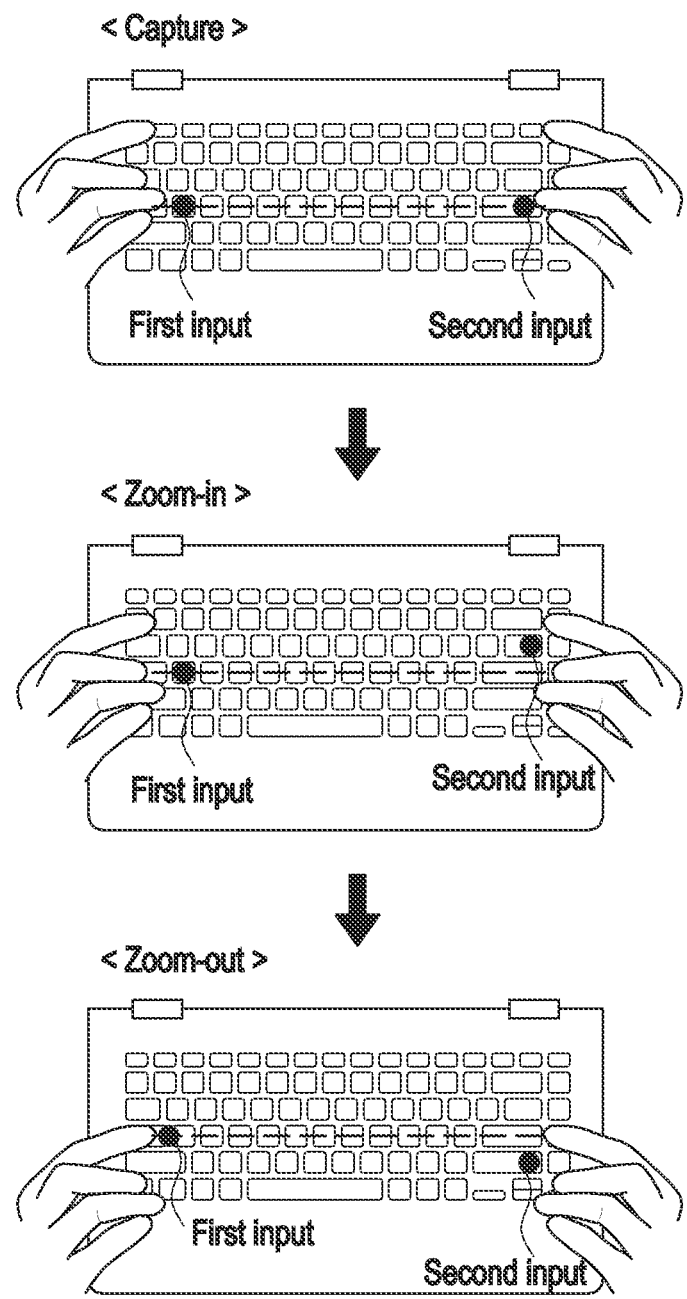
FIG. 11 is a view illustrating examples of an operation of performing a function corresponding to an identified pattern of an electronic device according to various embodiments.

FIG. 9 is a view illustrating an example of an operation of identifying at least one input using at least some of a plurality of keys 201 according to a change in a folding angle of an electronic device 200 according to various embodiments. FIG. 10A is a view illustrating an example of an operation of identifying a pattern corresponding to at least one identified input of an electronic device 200 (e.g., a processor 350) according to various embodiments. FIG. 10B is a view illustrating another example of an operation of identifying a pattern corresponding to at least one identified input of an electronic device 200 (e.g., a processor 350) according to various embodiments. FIG. 11 is a view illustrating examples of an operation of performing a function corresponding to an identified pattern of an electronic device 200 according to various embodiments.

According to various embodiments, in operation 801, the electronic device 200 may execute a specific application and, in operation 803, identify a change in the folding angle while the specific application is running and, in operation 805, determine whether the folding angle meets a designated condition. For example, in a state in which at least one (e.g., the first housing 210) among the plurality of housings (e.g., the first housing 210 and the second housing 220) is rotated about the hinge 230 in one direction (e.g., clockwise) so that a predetermined folding angle (e.g., the first angle Θ1) (e.g., an acute angle or an obtuse angle) is formed between the two housings as illustrated in 901 of FIG. 9, the electronic device 200 may execute a specific application (e.g., a camera application) and display the execution screen 621 of the executed specific application on the display 202. As illustrated in 902 and 903 of FIG. 9, in a state in which the specific application is running, at least one of the two housings (e.g., the first housing 210 and the second housing 220) is rotated about the hinge 230, and the electronic device 200 may identify the folding angle changed by the rotation, using the sensor 310 and determine whether the identified folding angle (e.g., the second angle θ2) is included in a designated angle range (e.g., 180 degrees or more). Operations 801 to 805 of the electronic device 200 may be performed like operations 501 to 505 of the electronic device 200 as described above, and no duplicate description thereof is given below.

According to various embodiments, if the folding angle meets a designated condition, the electronic device 200 may identify a first input 1011a using at least one of first keys 930a of the plurality of keys and identify a second input 1012a using at least one of second keys 930b in operation 807 and, in operation 809, perform functions corresponding to the first input 1011a and the second input 1012a of the specific application. In an embodiment, the electronic device 200 may classify (or identify) keys having position information meeting different conditions into different groups. For example, the electronic device 200 may classify (or identify) the plurality of keys 201 into different groups (or different areas) of keys (e.g., first keys 930a and second keys 930b) having coordinate information (e.g., the x coordinate is in a designated range) meeting different conditions based on coordinate information 400 for the plurality of keys 201. As an example as illustrated in FIGS. 10A and 10B, the electronic device 200 may classify keys, whose coordinate in one direction (e.g., the x direction) is included in a designated first range, among the plurality of keys 201, into the first keys 930a and keys, whose coordinate in one direction (e.g., the x direction) is included in a second range different from the first range, into second keys 930b, based on the coordinate information 400 for each of the plurality of keys 201. In another embodiment, the electronic device 200 may define (or identify) an area, for which the coordinate in one direction (e.g., the x direction) is in a designated first range (e.g., 0 or more and x1 or less) and the coordinate in another direction (e.g., the y direction) is in the entire range, as a first area 931 and define (or identify) an area, for which the coordinate in one direction (e.g., the x direction) is in a second range (e.g., more than x1) and the coordinate in another direction (e.g., the y direction) is in the entire range, as a second area 932, based on the coordinate information 400 for each of the plurality of keys 201. Accordingly, the first keys 930a may be keys for the first area 931, and the second keys 930b may be keys for the second area 932. Without being limited thereto, the electronic device 200 may classify the plurality of keys 201 into a specific group of keys or identify (or define) areas based on coordinates in another direction (e.g., the y direction) or may classify the plurality of keys 201 into more groups (e.g., three or more) and/or define (or identify) more areas (e.g., three or more). The electronic device 200 may identify which group of key has been pressed or in what area, based on the classification of the plurality of keys 201 into different groups of keys (e.g., the first keys 930a and the second keys 930b) as described above.

According to various embodiments, the electronic device 200 may determine whether each of inputs identified using at least one of the plurality of keys 201 is associated with a different group based on the classification of the plurality of keys 201 into different groups of keys (e.g., the first keys 930a and the second keys 930b) and, if each input is associated with a different group, identify the code corresponding to the inputs. Or, the electronic device 200 may determine the area associated with each input identified using at least some of the plurality of keys 201 (or the area where each input has occurred) and, if each input is associated with a different area (or occurs in a different area), identify the code corresponding to the inputs. In an embodiment, if at least one of the first keys 930a determined among the plurality of keys 201 are pressed as illustrated in 630 of FIG. 6, the electronic device 200 may identify at least one first input 1011a and, if at least one of the second keys 930b different from the first keys 930a among the plurality of keys 201 are pressed, identify at least one second input 1012a. According to identification of position information (e.g., the x coordinate) for at least some of the plurality of keys 201 corresponding to the inputs (e.g., the first input 1011a or the second input 1012a), the electronic device 200 may identify that the inputs are associated with different specific groups of keys (e.g., the first keys 930a and the second keys 930b) and/or different specific areas (e.g., the first area 931 and the second area 932). If the identified inputs are associated with keys of different areas or different groups, the electronic device 200 may identify the code corresponding to the identified inputs and perform the function corresponding to at least one identified input of the application based on the identification of the code, which is described below. In another embodiment, if the electronic device 200 identifies that the identified inputs are associated with the same group of keys and/or the same area (or if the electronic device 200 identifies that each of the identified inputs is not associated with a different group of key and/or a different area), the electronic device 200 may disregard the identified inputs. Hereinafter, an operation for identifying the code corresponding to the identified inputs of the electronic device 200 is described.

According to various embodiments, the electronic device 200 may identify an input pattern based on coordinate information in a different direction (e.g., the y direction) for the inputs identified using different groups of keys or keys in different areas (e.g., at least one first input 1011a and at least one second input 1012a) and identify the code corresponding to the identified input pattern. For example, as illustrated in FIGS. 10A and 10B, the electronic device 200 may identify the pattern according to the result of comparison between the coordinate in another direction (e.g., the y direction) of at least one input (e.g., the at least one first input 1011a) associated with a specific group of keys (e.g., the first keys 930a) (or a specific area (e.g., the first area 931)) and the coordinate in another direction (e.g., the y direction) of at least one input (e.g., the at least one second input 1012a) associated with the remaining group of keys (e.g., the second keys 930b) (or another area (e.g., the second area 932)). In an embodiment, the electronic device 200 may identify the group (e.g., the first keys 930a (or an area (e.g., the first area 931)), where an input is first generated, among the plurality of groups of keys (e.g., the first keys 930a and the second keys 930b) (or a plurality of areas (e.g., the first area 931 and the second area 932)) and compare the coordinate (e.g., the y coordinate) of the input (e.g., the first input) generated in the group or area with the coordinate (e.g., the y coordinate) of the input identified in another group (e.g., the second keys 930b) or another area (e.g., the second area 932). In an embodiment, the electronic device 200 may compare the coordinate (e.g., the y coordinate) of the input (e.g., the first input) generated in a preset group of keys (e.g., the first keys 930a or an area (e.g., the first area 931)) among the plurality of groups of keys (e.g., the first keys 930a and the second keys 930b) (or a plurality of areas (e.g., the first area 931 and the second area 932)) with the coordinate (e.g., the y coordinate) of the input identified in another group (e.g., the second keys 930b) or another area (e.g., the second area 932).

The electronic device 200 may previously store the code corresponding to each of the coordinates in the other direction (e.g., the y direction) of the inputs and identify the code based on the coordinates in the other direction (e.g., the y direction) of the received inputs based on the stored information. For example, referring to FIG. 10A, the electronic device 200 may receive a single input from each of different groups (or different areas) and identify the code based on the y coordinate of the identified single input. For example, as illustrated in FIG. 10A, the electronic device 200 may identify the first input 1011a using one key among the first keys 930a and identify the second input 1012a using one key among the second keys 930b. As an example, as illustrated in 1001 of FIG. 10A, if the y coordinate (e.g., y1) of the first input 1011a corresponds to (or identical to) the y coordinate of the second input 1012a, the electronic device 200 may determine that the identified inputs are in a first pattern and identify a first code. As another example, as illustrated in 1002 of FIG. 10A, if the y coordinate of the second input 1012a is larger than the y coordinate (e.g., y1) of the first input 1011a, the electronic device 200 may determine that the identified inputs are in a second pattern and identify a second code. As another example, as illustrated in 1003 of FIG. 10A, if the y coordinate of the second input 1012a is smaller than the y coordinate (e.g., y1) of the first input 1011a, the electronic device 200 may determine that the identified inputs are in a third pattern and identify a third code. It is also possible to only perform the operation of identifying the code without performing the operation of identifying the pattern.

As another example, referring to FIG. 10B, if a plurality of inputs are identified from different groups (or different areas), the electronic device 200 may calculate one y coordinate based on the y coordinates of the plurality of inputs and identify the code using the calculated y coordinate. For example, as illustrated in 1004, 1005, and 1006 of FIG. 10B, if a plurality of inputs 1012b are identified using a group of keys (e.g., the second keys 930b), the electronic device 200 may calculate the average of the y coordinates corresponding to the plurality of identified inputs 1012b and compare the y coordinate (e.g., y1) of the identified input 1011b using a specific group (e.g., the first keys 930a) and the calculated average to thereby identify the code. The operation of identifying the code based on comparison between the y coordinates by the electronic device 200 may be performed as described above in connection with FIG. 10A, and no duplicate description thereof is given. Further, without being limited thereto, the electronic device 200 may identify the range of the y coordinates corresponding to the plurality of identified inputs. The electronic device 200 may identify the first code if the y coordinate of the input identified using the specific group of keys (e.g., the first keys 930*a*) is included in the identified range of y coordinates, identify the second code if the minimum value of the range is larger than the y coordinate of the input, and identify the third code if the maximum value of the range is smaller than the y coordinate of the input. Meanwhile, without being limited to those described and/or shown, in a case where a plurality of inputs are identified using a specific group of keys (e.g., the first keys 930*a*), the operation described above in connection with FIG. 10B may be applied.

According to various embodiments, upon identifying at least one input using at least some of the specific group of keys (e.g., the first keys 930*a*) (or keys in the specific area (e.g., the keys in the first area 931)), the electronic device 200 may display a graphic user interface 933 on the display 202 (or the execution screen 521). The graphic user interface 933 may be implemented as various types of graphic user interfaces, such as a pop-up window or panel, but is not limited thereto. The graphic user interface 933 may include information indicating the function of the application corresponding to the position of the key pressed among another group of keys (or keys in another area) as illustrated in 903 of FIG. 9. As an example, the graphic user interface may include an object 934 indicating the first area 931 and objects 935, 936, and 937 indicating a plurality of sub areas included in the second area 932. The plurality of sub areas are areas corresponding to (or identical to), more than, and less than the position of at least one first input 1011*a* (e.g., they direction) described above and, as described above, each sub area may be associated with a different code and/or a different function. For example, a first sub area may be an area having a larger y coordinate range than they coordinate of the first input 1011*a* of the second area 932, a second sub area may be an area having the same y coordinate as the y coordinate of the first input 1011*a* of the second area 932, and a third sub area may be an area having a smaller y coordinate range than the y coordinate of the first input 1011*a* of the second area 932.

Each of the sub objects 935, 936, and 937 may indicate the position of the above-described sub area of the second area 932 (or may correspond to the sub area). For example, the first sub object 935 may be positioned at the uppermost end and include information (e.g., the text "zoom-in") for the function corresponding to the first sub area to indicate the first sub area, the third sub object 937 may be positioned at the lowermost end and include information (e.g., the text "zoom-out") for the function corresponding to the third sub area to indicate the third sub area, and the second sub object 936 may be positioned between the first sub object and the second sub object and include information (e.g., the text "capture") for the function corresponding to the second sub area. The user may recognize the position of each sub object and recognize the key in the position which needs to be pressed in the second area 932 for use of a specific function according to the position of each sub object. Further, the position and area of each sub object may be varied based on the position (e.g., the y coordinate) of at least one first input identified in the first area 931. For example, as the position (e.g., the y coordinate) of the first input increases, the area of the first sub area 935 may be changed to be larger than the size of the third sub area 937 and, as the position (e.g., the y coordinate) of the first input decreases, the area of the first sub area 935 may be changed to be smaller than the size of the third sub area 937.

Even in this case, if the application currently running in the foreground mode receives the code as described above, the electronic device 200 may display the above-described graphic user interface only when the operation of performing the function corresponding to the code is supported, but embodiments of the disclosure are not limited thereto.

According to various embodiments, the electronic device 200 may identify the code corresponding to the identified pattern and may perform (or execute, or provide) the function of the application corresponding to the identified code. For example, if the currently running application is a camera application, the electronic device 200 may perform the capture function based on identifying inputs (e.g., the first input and the second input) having coordinates (e.g., the y coordinates) corresponding to each other as illustrated in FIG. 11 and identifying the first code, perform the zoom-in function based on identifying the second input having the coordinate (e.g., the y coordinate) larger than the coordinate (e.g., the y coordinate) of the first input and identifying the second code, and perform the zoom-out function based on identifying the second input having the coordinate (e.g., the y coordinate) smaller than the coordinate (e.g., the y coordinate) of the first input and identifying the second code. In response to the number of times of identifying the code (or the number of times of identifying inputs), a function may be performed. For example, if the second code is identified twice, the zoom-in function may be performed twice at a designated magnification. As another example, without being limited thereto, the electronic device 200 may perform the function of the corresponding type of application for each code according to the type of the currently running application. For example, if the currently running application is a video application, the electronic device 200 may perform a pause function based on the identification of the first code, perform a forward search function based on the identification of the second code, and perform a backward search function based on the identification of the third code. Without being limited thereto, various functions may be configured corresponding to each code.

Meanwhile, without being limited thereto, as described above, the electronic device 200 may transfer the identified input to the application so that the application identifies the function or may identify the function of the application corresponding to the identified pattern on its own, and no duplicate description thereof is given.

An example of an operation of an electronic device 200 is described below according to various embodiments.

According to various embodiments, in a state in which the folding angle between the housings (e.g., the first housing 210 and the second housing 220) is included in a designated angle range, and the specific application is running (e.g., a specific type of application (e.g., the camera application) is running or the application including the above-described function detection module 361 is running), if at least one input is identified using some of the plurality of keys 201, the electronic device 200 may automatically control the camera 203, which is disposed on the housing with the plurality of keys 201.

Figure 12:
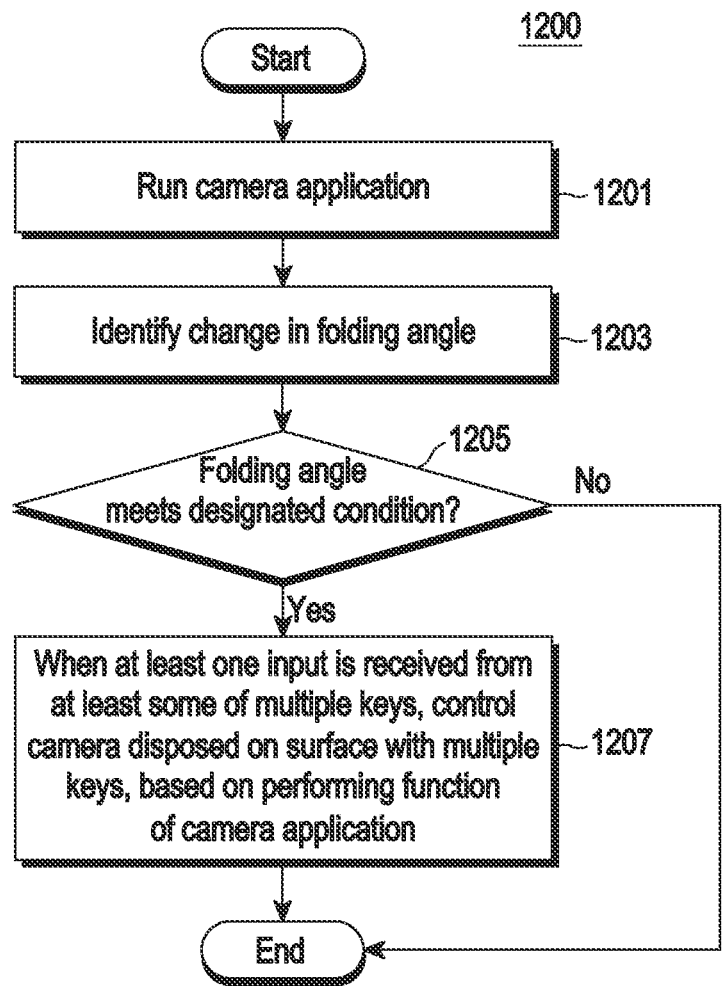
FIG. 12 is a flowchart illustrating an example of an operation of an electronic device according to various embodiments.

FIG. 12 is a flowchart 1200 illustrating an example of an operation of an electronic device 200 according to various embodiments. The operations shown in FIG. 12 are not limited to the shown order but may rather be performed in other various orders. According to various embodiments, more or less operations than those of FIG. 12 may be performed. FIG. 12 is described below with reference to FIG. 13.

Figure 13:
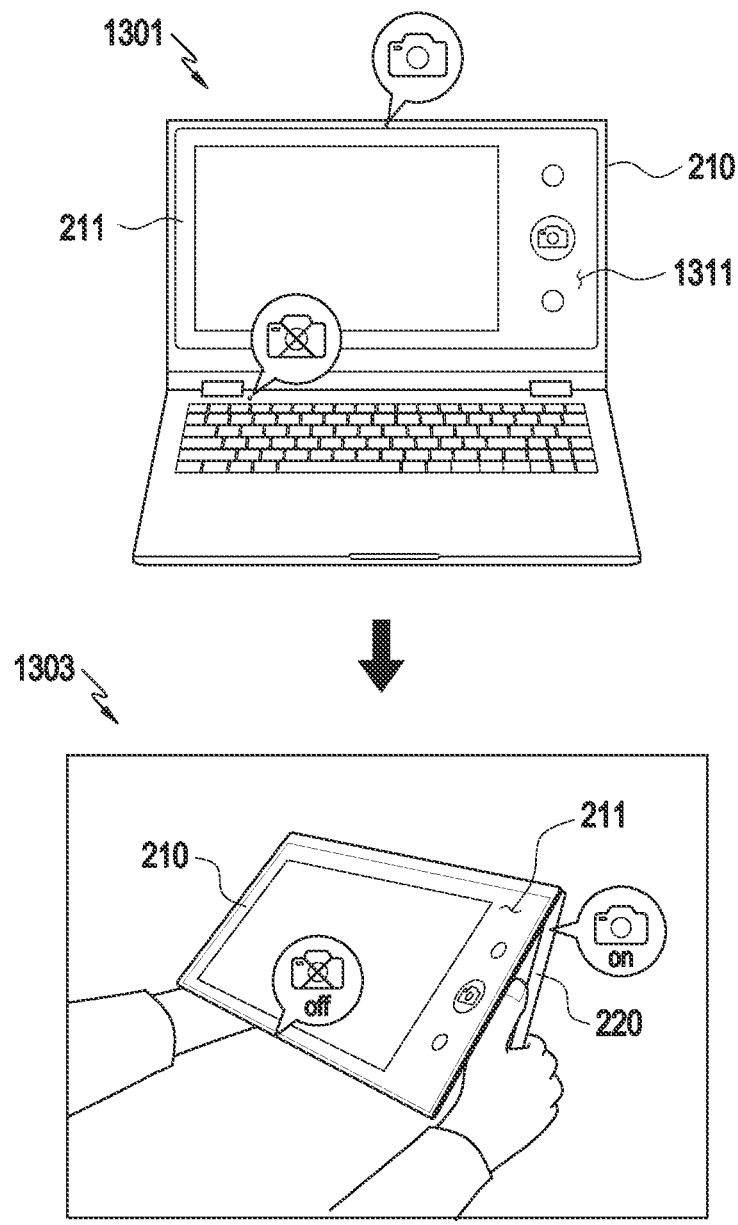
FIG. 13 is a view illustrating an example of an operation of selecting a camera to be controlled, according to a change in a folding angle of an electronic device, according to various embodiments.

FIG. 13 is a view illustrating an example of an operation of selecting a camera 203 to be controlled, according to a change in a folding angle of an electronic device 200, according to various embodiments.

According to various embodiments, the electronic device 200 may execute a camera application in operation 1201. For example, in a state in which a predetermined folding angle is formed between the housings (e.g., the first housing 210 and the second housing 220) as illustrated in 1301 of FIG. 13, the electronic device 200 may perform the camera application and may display the execution screen 1311 of the executed camera application on the display 202. The execution screen 1311 of the camera application may include at least one icon implemented to provide a specific function. The electronic device 200 may drive and/or control the camera 203 disposed on one housing (e.g., the first housing 210) with the display 202 among the plurality of cameras 203 based on the execution of the camera application.

According to various embodiments, the electronic device 200 may identify a change in the folding angle in operation 1203 and, in operation 1205, may determine whether the folding angle meets a designated condition. For example, if (or while) part of the housings (e.g., the first housing 210 and the second housing 220) is rotated as illustrated in 1301 to 1303 of FIG. 13, the electronic device 200 may identify the changed folding angle using the sensor 310 and may determine whether the identified folding angle (e.g., the second angle θ2) is included in the designated range (e.g., 180 degrees or more). If the folding angle (e.g., the second angle θ2) is included in the designated range, the electronic device 200 may determine that the folding angle meets the designated condition. Operations 1203 to 1205 of the electronic device 200 may be performed like operations 503 to 505 of the electronic device 200 as described above, and no duplicate description thereof is given below.

According to various embodiments, in operation 1207, if at least one input is identified using at least one of the plurality of keys, the electronic device 200 may control the camera 203 disposed on the housing with the plurality of keys 201 based on performing the function of the camera application. For example, if the folding angle meets a designated condition as illustrated in 1303 of FIG. 13, the electronic device 200 may drive and/or control the camera 203 disposed on the housing (e.g., the second housing 220) with the plurality of keys 201. The upper surface of the second housing 220 may face forward, so that the front may be captured by the camera 203 disposed on the upper surface of the second housing 220.

According to various embodiments, there may be provided an electronic device (e.g., 200 of FIG. 2A), comprising a first housing (e.g., 210 of FIG. 2A) including a first surface and a second surface facing in a direction opposite to a direction in which the first surface faces; a second housing (e.g., 220 of FIG. 2A) including a third surface corresponding to the first surface of the first housing (e.g., 210 of FIG. 2A) and a fourth surface facing in a direction opposite to a direction in which the third surface faces; a hinge rotatably connecting the first housing (e.g., 210 of FIG. 2A) and the second housing (e.g., 220 of FIG. 2A); at least one first camera (e.g., 203 of FIG. 2A) disposed on the first surface of the first housing (e.g., 210 of FIG. 2A) and at least one second camera (e.g., 204 of FIG. 2A) disposed on the second surface; a display (e.g., 201 of FIG. 2A) disposed on the first surface of the first housing (e.g., 210 of FIG. 2A); a plurality of keys (e.g., 201 of FIG. 2A) disposed on the third surface of the second housing (e.g., 220 of FIG. 2A); a sensor (e.g., 310 of FIG. 3A); and at least one processor (e.g., 350 of FIG. 3A); wherein the at least one processor (e.g., 350 of FIG. 3A) is configured to: execute a camera application, identify a change in a folding angle between the first housing (e.g., 210 of FIG. 2A) and the second housing (e.g., 220 of FIG. 2A) while the camera application is executed, using the sensor (e.g., 310 of FIG. 3A), identify at least one first input using at least some of first keys among the plurality of keys (e.g., 201 of FIG. 2A) and identify at least one second input using at least some of remaining second keys, different from the first keys, among the plurality of keys (e.g., 201 of FIG. 2A), and perform a function of the camera application corresponding to the at least one first input and the at least one second input, based on the changed folding angle being included in a designated angle range.

According to various embodiments, there may be provided the electronic device (e.g., 200 of FIG. 2A), wherein the at least one processor (e.g., 350 of FIG. 3A) is configured to: identify a code corresponding to the at least one first input and the at least one second input among a plurality of codes, and transfer the identified code to the executed camera application so that the function of the camera application is performed.

According to various embodiments, there may be provided the electronic device (e.g., 200 of FIG. 2A), wherein the at least one processor (e.g., 350 of FIG. 3A) is configured to: when a plurality of applications are executed on the electronic device (e.g., 200 of FIG. 2A), identify the camera application running in a foreground mode among the plurality of applications, and transfer the identified code to the identified camera application.

According to various embodiments, there may be provided the electronic device (e.g., 200 of FIG. 2A), wherein the camera application is pre-configured to perform a function corresponding to the code in response to the code when receiving the code.

According to various embodiments, there may be provided the electronic device (e.g., 200 of FIG. 2A), wherein the at least one processor (e.g., 350 of FIG. 3A) is configured to: based on transferring the code to the camera application: control to perform a capture function of the camera application when the code is a first code, control to perform a zoom-in function of the camera application when the code is a second code, and control to perform a zoom-out function of the camera application when the code is a third code.

According to various embodiments, there may be provided the electronic device (e.g., 200 of FIG. 2A), wherein the at least one processor (e.g., 350 of FIG. 3A) is configured to: store position information for the plurality of keys (e.g., 201 of FIG. 2A) in a memory, and identify the first keys having position information meeting a designated first condition and the second keys having position information meeting a designated second condition from the plurality of keys (e.g., 201 of FIG. 2A), based on the position information for the plurality of keys (e.g., 201 of FIG. 2A).

According to various embodiments, there may be provided the electronic device (e.g., 200 of FIG. 2A), wherein each of the position information indicates a coordinate in one direction and a coordinate in another direction of each of the plurality of keys (e.g., 201 of FIG. 2A), and wherein the at least one processor (e.g., 350 of FIG. 3A) is configured to: identify the first keys, for which the coordinate in the one direction is in a first range, and the second keys, for which the coordinate in the one direction is in a second range different from the first range.

According to various embodiments, there may be provided the electronic device (e.g., 200 of FIG. 2A), wherein the at least one processor (e.g., 350 of FIG. 3A) is configured to: upon identifying the at least one first input, display, on the display (e.g., 201 of FIG. 2A), a graphic user interface including information for a function of the camera application for each of sub areas, for which the coordinate in the one direction is in the second range.

According to various embodiments, there may be provided the electronic device (e.g., 200 of FIG. 2A), wherein the at least one processor (e.g., 350 of FIG. 3A) is configured to: identify a first coordinate in the other direction of the at least one first input and a second coordinate in the other direction of the at least one second input, based on identifying the at least one first input and the at least one second input, and identify the code, based on comparison between the first coordinate and the second coordinate.

According to various embodiments, there may be provided the electronic device (e.g., 200 of FIG. 2A), wherein the at least one processor (e.g., 350 of FIG. 3A) is configured to: based on the comparison between the first coordinate and the second coordinate, when the first coordinate corresponds to the second coordinate, identify a first code and perform a first function of the camera application corresponding to the first code, when the first coordinate is larger than the second coordinate, identify a second code and perform a second function of the camera application corresponding to the second code, and when the first coordinate is smaller than the second coordinate, identify a third code and perform a third function of the camera application corresponding to the third code.

According to various embodiments, there may be provided the electronic device (e.g., 200 of FIG. 2A), wherein the at least one processor (e.g., 350 of FIG. 3A) is configured to: when at least one of the at least one first input or the at least one second input is a plurality of inputs, identify coordinates in the other direction for each of the plurality of inputs, and calculate one coordinate in the other direction based on the identified coordinates.

According to various embodiments, there may be provided a method for operating an electronic device (e.g., 200 of FIG. 2A), comprising executing a camera application; identifying a change in a folding angle between a first housing (e.g., 210 of FIG. 2A) and a second housing (e.g., 220 of FIG. 2A) of the electronic device (e.g., 200 of FIG. 2A) while the camera application is executed, using a sensor (e.g., 310 of FIG. 3A) of the electronic device (e.g., 200 of FIG. 2A); identifying at least one first input using at least some of first keys among the plurality of keys (e.g., 201 of FIG. 2A) and identifying at least one second input using at least some of remaining second keys, different from the first keys, among the plurality of keys (e.g., 201 of FIG. 2A); and performing a function of the camera application corresponding to the at least one first input and the at least one second input, based on the changed folding angle being included in a designated angle range.

According to various embodiments, there may be provided the method, further comprising identifying a code corresponding to the at least one first input and the at least one second input among a plurality of codes; and transferring the identified code to the executed camera application so that the function of the camera application is performed.

According to various embodiments, there may be provided the method, further comprising, when a plurality of applications are executed on the electronic device (e.g., 200 of FIG. 2A), identifying the camera application running in a foreground mode among the plurality of applications; and transferring the identified code to the identified camera application.

According to various embodiments, there may be provided the method, wherein the camera application is pre-configured to perform a function corresponding to the code in response to the code when receiving the code.

According to various embodiments, there may be provided the method, further comprising, based on transferring the code to the camera application: controlling to perform a capture function of the camera application when the code is a first code; controlling to perform a zoom-in function of the camera application when the code is a second code; and controlling to perform a zoom-out function of the camera application when the code is a third code.

According to various embodiments, there may be provided the method, further comprising storing position information for the plurality of keys (e.g., 201 of FIG. 2A) in a memory; and identifying the first keys having position information meeting a designated first condition and the second keys having position information meeting a designated second condition from the plurality of keys (e.g., 201 of FIG. 2A), based on the position information for the plurality of keys (e.g., 201 of FIG. 2A).

According to various embodiments, there may be provided the method, wherein each of the position information indicates a coordinate in one direction and a coordinate in another direction of each of the plurality of keys (e.g., 201 of FIG. 2A), and further comprising identifying the first keys, for which the coordinate in the one direction is in a first range, and the second keys, for which the coordinate in the other direction is in a second range different from the first range.

According to various embodiments, there may be provided the method, further comprising, upon identifying the at least one first input, displaying, on the display (e.g., 201 of FIG. 2A), a graphic user interface including information for a function of the camera application for each of sub areas, for which the coordinate in the one direction is in the second range.

According to various embodiments, there may be provided an electronic device (e.g., 200 of FIG. 2A), comprising a first housing (e.g., 210 of FIG. 2A) including a first surface and a second surface facing in a direction opposite to a direction in which the first surface faces; a second housing (e.g., 220 of FIG. 2A) including a third surface corresponding to the first surface of the first housing (e.g., 210 of FIG. 2A) and a fourth surface facing in a direction opposite to a direction in which the third surface faces; a hinge rotatably connecting the first housing (e.g., 210 of FIG. 2A) and the second housing (e.g., 220 of FIG. 2A); at least one first camera (e.g., 203 of FIG. 2A) disposed on the first surface of the first housing (e.g., 210 of FIG. 2A) and at least one second camera (e.g., 204 of FIG. 2A) disposed on the second surface; a display (e.g., 201 of FIG. 2A) disposed on the first surface of the first housing (e.g., 210 of FIG. 2A); a plurality of keys (e.g., 201 of FIG. 2A) disposed on the third surface of the second housing (e.g., 220 of FIG. 2A); a sensor (e.g., 310 of FIG. 3A); and at least one processor (e.g., 350 of FIG. 3A); wherein the at least one processor (e.g., 350 of FIG. 3A) is configured to: execute a camera application, receive an input through at least some of the plurality of keys (e.g., 201 of FIG. 2A) while the camera application is executed, perform a first function of the camera application corresponding to the input, based on a folding angle between the first housing (e.g., 210 of FIG. 2A) and the second housing (e.g., 220 of FIG. 2A) identified through the sensor (e.g., 310 of FIG. 3A) being included in a designated angle range, and perform a second function of the camera application corresponding to text corresponding to the input, based on the folding angle being not included in the designated angle range.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a first housing including a first surface and a second surface facing in a direction opposite to a direction in which the first surface faces;
   a second housing including a third surface corresponding to the first surface of the first housing and a fourth surface facing in a direction opposite to a direction in which the third surface faces;
   a hinge rotatably connecting the first housing and the second housing;
   at least one first camera disposed on the first surface of the first housing and at least one second camera disposed on the second surface;
   a display disposed on the first surface of the first housing;
   a keyboard including a plurality of keys disposed on the third surface of the second housing, the plurality of keys comprising hardware keys;
   a sensor;
   memory storing one or more computer programs; and
   one or more processors communicatively coupled to the at least one first camera, the at least one second camera, the display, the plurality of keys, the sensor, and the memory,
   wherein the one or more computer programs include computer-executable instructions that, when executed by the one or more processors, cause the electronic device to:
   execute a camera application,
   while executing the camera application, identify, using the sensor, a change in a folding angle between the first housing and the second housing,
   after identifying the change in the folding angle, identify at least one first input using at least one of first keys among the plurality of keys of the keyboard and identify at least one second input using at least one of remaining second keys, different from the first keys, among the plurality of keys of the keyboard, and
   based on the folding angle changing to an angle included in a designated angle range and the identifying of the at least one first input and the at least one second input, perform a function of the camera application corresponding to the at least one first input and the at least one second input.

2. The electronic device of claim 1, wherein the one or more computer programs further include computer-executable instructions that, when executed by the one or more processors, cause the electronic device to:
   identify a code corresponding to the at least one first input and the at least one second input among a plurality of codes, and
   transfer the code to the camera application so that the function of the camera application is performed.

3. The electronic device of claim 2, wherein the one or more computer programs further include computer-executable instructions that, when executed by the one or more processors, cause the electronic device to:
   based on a plurality of applications being executed on the electronic device, identify the camera application running in a foreground mode among the plurality of applications, and
   transfer the code to the camera application.

4. The electronic device of claim 3, wherein the camera application is pre-configured to, in response to receiving the code, perform at least one function corresponding to the code.

5. The electronic device of claim 2, wherein the one or more computer programs further include computer-executable instructions that, when executed by the one or more processors, cause the electronic device to:
   based on the transferring of the code to the camera application:
   in response to the code being a first code, control to perform a capture function of the camera application;
   in response to the code being a second code, control to perform a zoom-in function of the camera application; and
   in response to the code being a third code, control to perform a zoom-out function of the camera application.

6. The electronic device of claim 2, wherein the one or more computer programs further include computer-executable instructions that, when executed by the one or more processors, cause the electronic device to:
   store, in the memory, position information for the plurality of keys, and
   based on the position information for the plurality of keys, identify the first keys having position information meeting a designated first condition and the second keys having position information meeting a designated second condition from the plurality of keys.

7. The electronic device of claim 6,
   wherein the position information indicates a coordinate in one direction and a coordinate in another direction of each of the plurality of keys, and
   wherein the one or more computer programs further include computer-executable instructions that, when executed by the one or more processors, cause the electronic device to:
   identify the first keys, for which the coordinate in the one direction is in a first range, and the second keys, for which the coordinate in the one direction is in a second range different from the first range.

8. The electronic device of claim 7, wherein the one or more computer programs further include computer-executable instructions that, when executed by the one or more processors, cause the electronic device to:
   based on identifying the at least one first input, control the display to display a graphic user interface (GUI) including information for at least one function of the camera application for each of sub areas, for which the coordinate in the one direction is in the second range.

9. The electronic device of claim 7, wherein the one or more computer programs further include computer-executable instructions that, when executed by the one or more processors, cause the electronic device to:
   based on the identifying of the at least one first input and the at least one second input, identify a first coordinate in the other direction of the at least one first input and a second coordinate in the other direction of the at least one second input, and based on a comparison between the first coordinate and the second coordinate, identify the code.

10. The electronic device of claim 9, wherein the one or more computer programs further include computer-executable instructions that, when executed by the one or more processors, cause the electronic device to:

based on the comparison between the first coordinate and the second coordinate:
in response to the first coordinate corresponding to the second coordinate, identify a first code and perform a first function of the camera application, the first function corresponding to the first code;
in response to the first coordinate being larger than the second coordinate, identify a second code and perform a second function of the camera application, the second function corresponding to the second code; and
in response to the first coordinate being smaller than the second coordinate, identify a third code and perform a third function of the camera application, the third function corresponding to the third code.

11. The electronic device of claim 10, wherein the one or more computer programs further include computer-executable instructions that, when executed by the one or more processors, cause the electronic device to:

based on at least one of the at least one first input or the at least one second input being a plurality of inputs, identify coordinates in the other direction for each of the plurality of inputs, and
based on the coordinates, calculate one coordinate in the other direction.

12. A method performed by an electronic device, the method comprising:
executing, by the electronic device, a camera application;
while executing the camera application, identifying, by the electronic device using a sensor of the electronic device, a change in a folding angle between a first housing and a second housing of the electronic device, a keyboard including a plurality of keys being disposed on a surface of the second housing, the plurality of keys comprising hardware keys;
after identifying the change in the folding angle, identifying, by the electronic device, at least one first input using at least one of first keys among the plurality of keys of the keyboard and identifying at least one second input using at least one of remaining second keys, different from the first keys, among the plurality of keys of the keyboard; and
based on the folding angle changing to an angle included in a designated angle range and the identifying of the at least one first input and the at least one second input, performing, by the electronic device, a function of the camera application corresponding to the at least one first input and the at least one second input.

13. The method of claim 12, further comprising:
identifying, by the electronic device, a code corresponding to the at least one first input and the at least one second input among a plurality of codes; and
transferring, by the electronic device, the code to the camera application so that the function of the camera application is performed.

14. The method of claim 13, further comprising:
based on a plurality of applications being executed on the electronic device, identifying, by the electronic device, the camera application running in a foreground mode among the plurality of applications; and
transferring, by the electronic device, the code to the camera application.

15. The method of claim 14, wherein the camera application is pre-configured to, in response to receiving the code, perform at least one function corresponding to the code.

16. The method of claim 14, further comprising:
based on the transferring of the code to the camera application:
in response to the code being a first code, controlling, by the electronic device, to perform a capture function of the camera application,
in response to the code being a second code, controlling, by the electronic device, to perform a zoom-in function of the camera application, and
in response to the code being a third code, controlling, by the electronic device, to perform a zoom-out function of the camera application.

17. The method of claim 14, further comprising:
storing, by the electronic device in a memory, position information for the plurality of keys; and
based on the position information for the plurality of keys, identifying, by the electronic device, the first keys having position information meeting a designated first condition and the second keys having position information meeting a designated second condition from the plurality of keys.

18. The method of claim 17,
wherein the position information indicates a coordinate in one direction and a coordinate in another direction of each of the plurality of keys, and
wherein the method further comprises:
identifying, by the electronic device, the first keys, for which the coordinate in the one direction is in a first range, and the second keys, for which the coordinate in the other direction is in a second range different from the first range.

19. The method of claim 18, further comprising:
based on the identifying of the at least one first input, displaying, by the electronic device on a display, a graphic user interface (GUI) including information for at least one function of the camera application for each of sub areas, for which the coordinate in the one direction is in the second range.

20. An electronic device, comprising:
a first housing including a first surface and a second surface facing in a direction opposite to a direction in which the first surface faces;
a second housing including a third surface corresponding to the first surface of the first housing and a fourth surface facing in a direction opposite to a direction in which the third surface faces;
a hinge rotatably connecting the first housing and the second housing;
at least one first camera disposed on the first surface of the first housing and at least one second camera disposed on the second surface;
a display disposed on the first surface of the first housing;
a keyboard including a plurality of keys disposed on the third surface of the second housing, the plurality of keys comprising hardware keys;
a sensor;
memory storing one or more computer programs; and
one or more processors, wherein the one or more computer programs further include computer-executable instructions that, when executed by the one or more processors, cause the electronic device to:
execute a camera application,
while executing the camera application, receive an input through at least some of the plurality of keys of the keyboard,
based on a folding angle, identified through the sensor, between the first housing and the second housing being included in a designated angle range while receiving the input, perform a first function of the camera application corresponding to the input, and
based on the folding angle, identified through the sensor, not being included in the designated angle range, perform a second function of the camera application corresponding to text corresponding to the input.

21. The electronic device of claim 1,
wherein the first keys are keys in a first area of the keyboard,
wherein the remaining second keys are keys in a second area of the keyboard different from the first area of the keyboard, and
wherein the hardware keys are included in at least one of a membrane keyboard, a pantograph keyboard, a mechanical keyboard, or a flinger keyboard.

22. The electronic device of claim 1, wherein the one or more computer programs further include computer-executable instructions that, when executed by the one or more processors, cause the electronic device to:
identify whether the at least one first input and the at least one second input are associated with different specific groups of keys,
based on identifying that the at least one first input and the at least one second input are associated with different specific groups of keys, identify a code corresponding to the identified at least one first input and the at least one second input, and
based on the identified code, perform the function of the camera application corresponding to the at least one first input and the at least one second input.

* * * * *